(12) United States Patent
Novikoff et al.

(10) Patent No.: US 11,328,013 B2
(45) Date of Patent: *May 10, 2022

(54) GENERATING THEME-BASED VIDEOS

(71) Applicant: Google LLC, Mountain View, CA (US)

(72) Inventors: Timothy Novikoff, Mountain View, CA (US); Jingyu Cui, Milpitas, CA (US)

(73) Assignee: Google LLC, Mountain View, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/836,415

(22) Filed: Mar. 31, 2020

(65) Prior Publication Data

US 2020/0226179 A1 Jul. 16, 2020

Related U.S. Application Data

(63) Continuation of application No. 15/694,728, filed on Sep. 1, 2017, now Pat. No. 10,642,893.

(60) Provisional application No. 62/383,568, filed on Sep. 5, 2016.

(51) Int. Cl.
| | | |
|---|---|---|
| *G06F 16/00* | (2019.01) | |
| *G06F 16/783* | (2019.01) | |
| *G06F 16/58* | (2019.01) | |
| *G06F 16/738* | (2019.01) | |
| *G06F 16/78* | (2019.01) | |
| *G06F 16/438* | (2019.01) | |

(52) U.S. Cl.
CPC ........ *G06F 16/783* (2019.01); *G06F 16/4393* (2019.01); *G06F 16/58* (2019.01); *G06F 16/738* (2019.01); *G06F 16/739* (2019.01); *G06F 16/7867* (2019.01)

(58) Field of Classification Search
None
See application file for complete search history.

(56) References Cited

U.S. PATENT DOCUMENTS

| | | |
|---|---|---|
| 7,319,780 B2 | 1/2008 | Fedorovskaya et al. |
| 8,254,647 B1 | 8/2012 | Nechyba et al. |
| 9,519,957 B1 | 12/2016 | Kulewski et al. |
| 2011/0154197 A1 | 6/2011 | Hawthorne et al. |
| 2011/0243453 A1 | 10/2011 | Kashima et al. |
| 2012/0330869 A1 | 12/2012 | Durham |

(Continued)

FOREIGN PATENT DOCUMENTS

| | | |
|---|---|---|
| EP | 1921627 | 6/2009 |
| KR | 20150086770 | 7/2015 |
| WO | 2013/096320 | 6/2013 |

OTHER PUBLICATIONS

Microsoft.com Store, Microsoft Photo Story app download screen, https://www.microsoft.com/en-us/store/apps/photo-story/9nblggh1z351, 2015, 11 pages.

(Continued)

*Primary Examiner* — Bai D Vu
(74) *Attorney, Agent, or Firm* — IP Spring

(57) ABSTRACT

Implementations relate to generating theme-based videos. In some implementations, a computer-implemented method to automatically generate a theme-based video includes obtaining image criteria for a theme from a theme definition, querying an image database to obtain a plurality of images that meet the image criteria, determining that a count of the plurality of images satisfies a threshold based on the theme definition, and generating the theme-based video that includes one or more of the plurality of images.

20 Claims, 10 Drawing Sheets

(56) References Cited

U.S. PATENT DOCUMENTS

| | | |
|---|---|---|
| 2013/0121591 A1 | 5/2013 | Hill |
| 2014/0254945 A1 | 9/2014 | Hibino et al. |
| 2015/0067708 A1 | 3/2015 | Jensen et al. |
| 2017/0160813 A1 | 6/2017 | Divakaran et al. |

OTHER PUBLICATIONS

WIPO, Written Opinion of the International Preliminary Examining Authority for International Patent Application No. PCT/US2016/068429, dated Feb. 12, 2018, 9 pages.

WIPO, International Preliminary Report on Patentability for International Patent Application No. PCT/US2017/049979, dated Jul. 26, 2018, 25 pages.

WIPO, International Preliminary Report on Patentability for International Patent Application No. PCT/US2016/068429, dated May 11, 2018, 19 pages.

WIPO, International Preliminary Report on Patentability for International Patent Application No. PCT/US2016/068429, dated May 11, 2018, 20 pages.

EPO, Communication under Rule 71(3) EPC for European Patent Application No. 17765552.9, dated May 22, 2019, 7 pages.

WIPO, International Search Report for International Patent Application No. PCT/US2017/049979, dated Nov. 15, 2017, 5 pages.

WIPO, Written Opinion for International Patent Application No. PCT/US2017/049979, dated Nov. 15, 2017, 7 pages.

WIPO, International Search Report for International Patent Application No. PCT/US2016/068429, dated Mar. 9, 2017, 6 pages.

WIPO, Written Opinion for International Patent Application No. PCT/US2016/068429, dated Mar. 9, 2017, 9 pages.

Martonik, "Where did Auto Awesome go in Google Photos?", Android Central, http://www.androidcentral.com/where-did-auto-awesome-go-google-photos, Jun. 5, 2015, 24 pages.

Summers, "Auto Awesome Movies for Google+ secretly edits your best videos into a slick, customizable highlight reel", TNW News, http://thenextweb.com/google/2013/10/29/google-photo-editing-tool-auto-awesome-now-creates-stunning-edits-videos/, Oct. 29, 2013, 3 pages.

Thomas, Jr., "New app creates stylized story compilations from your photos", Microsoft.com; http://blogs.microsoft.com/next/2015/08/13/new-app-creates-stylized-story-compilations-from-your-photos/, Aug. 13, 2015, 4 pages.

USPTO, Restriction Requirement for U.S. Appl. No. 15/071,154, dated Apr. 17, 2017, 9 pages.

USPTO, Non-final Office Action for U.S. Appl. No. 15/071,154, dated Aug. 21, 2017, 10 pages.

USPTO, Final Office Action for U.S. Appl. No. 15/071,154, dated Feb. 20, 2018, 11 pages.

USPTO, Notice of Allowance for U.S. Appl. No. 15/694,728, dated Jan. 8, 2020, 8 pages.

USPTO, Notice of Allowance for U.S. Appl. No. 15/071,154, dated Jul. 10, 2018, 8 pages.

USPTO, Non-final Office Action for U.S. Appl. No. 16/165,979, dated Oct. 18, 2019, 8 pages.

USPTO, Non-final Office Action for U.S. Appl. No. 15/694,728, dated Sep. 19, 2019, 19 pages.

USPTO, Final Office Action for U.S. Appl. No. 16/165,979, dated Apr. 27, 2020, 11 pages.

USPTO, Notice of Allowance for U.S. Appl. No. 16/165,979, dated Jan. 11, 2022, 7 pages.

GENERATING THEME-BASED VIDEOS

CROSS-REFERENCE TO RELATED APPLICATIONS

The present application is a continuation of U.S. patent application Ser. No. 15/694,728, filed Sep. 1, 2017 and titled "Generating Theme-Based Videos," which claims priority to U.S. Provisional Patent Application No. 62/383,568, filed Sep. 5, 2016 and titled "Generating Theme-Based Videos," the entire content of both of which are hereby incorporated by reference.

BACKGROUND

The popularity and convenience of digital camera devices as well as the widespread of use of Internet communications have caused user-produced visual content such as digital photographs and videos to become ubiquitous. For example, various types of images can be captured and displayed. For example, a plurality of images may be combined into a video (e.g., as a slideshow).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to generating theme-based videos. In some implementations, a computer-implemented method to automatically generate a theme-based video includes obtaining image criteria for a theme from a theme definition, querying an image database to obtain a plurality of images that meet the image criteria, determining that a count of the plurality of images satisfies a threshold based on the theme definition, and generating the theme-based video that includes one or more of the plurality of images.

In various examples of the method, the method further includes causing the theme-based video to be displayed to a user. In some implementations, the method further includes selecting the theme based on user profile information of a user for the theme-based video, a number of recent images that the user has uploaded to the image database, and/or a current date. In some implementations, the method further includes determining one or more available themes; determining a respective engagement metric for the one or more available themes; selecting the theme from the one or more available themes based at least in part on the respective engagement metric; after at least a portion of the theme-based video has been displayed, receiving feedback related to the theme-based video from the user; and adjusting the engagement metric for the theme based on the feedback for the theme-based video. For example, receiving the feedback can include obtaining a share indicator that indicates the user shared the theme-based video, a view indicator that indicates a count of views of the theme-based video, a deletion indicator that indicates that the theme-based video was deleted, a rating indicator that indicates a user rating for the theme-based video, and/or a notification response indicator that indicates that the user accessed the theme-based video from a notification.

In some implementations, the method further includes determining a user for the theme-based video, determining user profile information for the user, and selecting a soundtrack for the theme-based video based at least in part on the user profile information, where the theme-based video includes the soundtrack. In some implementations, the user profile information includes a user location and/or a user preference, and selecting the soundtrack includes determining that the user location matches a location parameter of the soundtrack, and/or determining that the user preference matches an audio parameter of the soundtrack. In some implementations, the method further includes calculating a confidence score based on the plurality of images and the theme definition, where the confidence score indicates a strength of match between the plurality of images and the image criteria, and selecting a soundtrack based at least in part on the user profile information and at least in part on the confidence score. In some implementations, the theme-based video can include a post-roll portion that indicates a source of the theme-based video, a soundtrack author of the soundtrack, and/or an author of the theme.

In some implementations, the method further comprises determining whether the count of the plurality of images satisfies the threshold; in response to determining that the count of the plurality of images does not satisfy the threshold, checking the image database until one or more additional images are detected in the image database; and in response to the one or more additional images being detected in the image database, repeating the determining whether the count of the plurality of images satisfies the threshold. In some implementations, the plurality of images are a subset of multiple images stored on the image database, and the method further comprises causing display of one or more selection options by a user device, where the one or more selection options include one or more images of the multiple images stored on the image database; receiving a selection of at least one image of the one or more images; and determining one or more of the image criteria based on the at least one selected image. For example, the one or more images can be determined from the multiple images based on at least one of the image criteria.

In some implementations, a non-transitory computer-readable medium includes one or more instructions stored thereon that when executed by a processor, cause the processor to perform operations. The operations include obtaining image criteria for a theme from a theme definition, querying an image database to obtain a plurality of images that meet the image criteria, determining that a time difference between a first timestamp associated with a first image of the plurality of images and a second timestamp associated with a second image of the plurality of images meets a threshold time difference based on the theme definition, and, based on determining that the time difference meets the threshold time difference, generating the theme-based video that includes one or more of the plurality of images.

In various examples of the computer-readable medium, the operations include determining a user for the theme-based video, determining user profile information for the user, where generating the theme-based video is based at least in part on the user profile information, and selecting a soundtrack for the theme-based video based at least in part on the user profile information, where generating the theme-based video includes generating the theme-based video to include the soundtrack. In some implementations, each of the plurality of images is associated with a respective timestamp of a plurality of timestamps, where the first timestamp is the earliest of the timestamps and the second timestamp is the most recent of the timestamps. In some implementations, the operations include determining one or more available themes, determining a respective engagement metric for the one or more available themes, and selecting the theme from the one or more available themes based at least in part on the respective engagement metric.

In some implementations, a system includes a memory and at least one processor configured to access the memory and configured to perform operations. The operations include obtaining a plurality of themes from a storage, where each of the plurality of themes includes a respective theme definition; determining respective image criteria from the respective theme definition for each of the plurality of themes; obtaining a plurality of images associated with a user from an image database; determining a respective subset of the plurality of images that meet the respective image criteria for each of the plurality of themes; selecting a particular theme of the plurality of themes for the video; and generating the video based on the selected particular theme of the plurality of themes. The video includes one or more images from the subset of the plurality of images for the particular theme.

In various examples of the system, the operation of selecting the particular theme includes ranking the plurality of themes based on a respective engagement metric for the plurality of themes, a respective diversity metric for the plurality of themes, and/or a user profile for a user for the video, and includes determining the particular theme based on the ranking. In some implementations, the operation of obtaining the plurality of themes includes determining available themes from a themes database, determining a respective engagement metric for each of the available themes, and selecting the plurality of themes from the available themes based at least in part on the respective engagement metric. In some implementations, the operation of obtaining the plurality of themes further includes determining available themes from a themes database, determining a respective diversity metric for each of the available themes, and selecting the plurality of themes from the available themes based at least in part on the respective diversity metrics, where the respective diversity metrics are based on a number of generated videos for the available themes, and/or historical data for the available themes. In some implementations, the operation of obtaining the plurality of themes is based on at least one theme date associated with at least one theme of the plurality of themes, where the theme date indicates a time at which the video is to be generated based on the at least one theme.

In some implementations, a system including a memory and at least one processor coupled to the memory can be provided to implement one or more of the features described herein. In some implementations, the method, computer-readable medium, and/or system further comprise further comprises using a machine learning application to automatically determine image content, an image content type and/or image criteria from data stored in a database, e.g., the image database. The machine learning application can automatically categorize the data. The data processed by the machine learning application, in particular data used as training data, comprises image data, communication data (e.g., e-mail and/or chat data), documents, map data, geographical location data, game data, metadata, synthetic data generated for the purpose of the training and/or personal profile data. This type of data can for example be used in the categorization of the data. Furthermore, the machine learning application can comprise a trained model, in particular a neural network, and/or an inference engine. In some implementations, one or more tags descriptive of the image are automatically assigned to an image, in particular by using a machine learning application, and the tag(s) are used in querying the image database.

DETAILED DESCRIPTION

Figure 1:
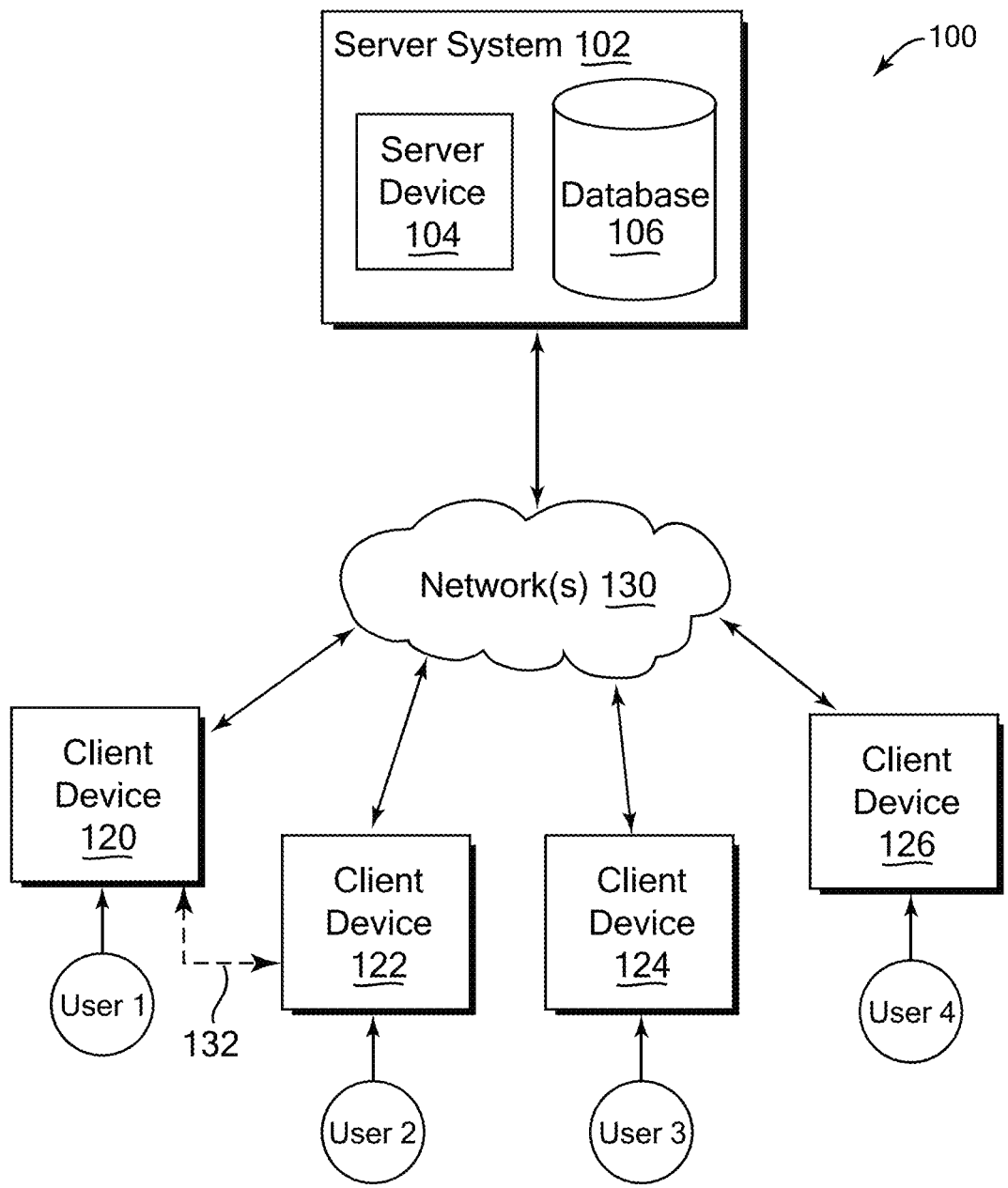
FIG. 1 is a block diagram of example systems and a network environment which may be used for one or more implementations described herein.

One or more implementations described herein relate to generating theme-based videos. In some implementations, a system can obtain image criteria for a theme from a theme definition. Images are obtained which meet the image criteria. For example, an image database can be queried to obtain the images. A soundtrack can be selected for the theme-based video. The theme-based video is generated, including one or more of the obtained images and the soundtrack. The theme-based video can be displayed to a user.

In various implementations, the theme can be selected based on user profile information of a user for the theme-based video, a number of recent images that the user has uploaded to the image database, and/or a current date or event. The system can determine whether a count of the obtained images satisfies a threshold based on the theme definition, where the video is generated if the count satisfies the threshold. For example, this allows a video to be generated with at least a particular amount of different images. Some implementations determine whether a time difference between a first image and a second image of the obtained images meets a threshold time difference based on the theme definition, e.g., whether the first and last images span a threshold amount of time. For example, this allows a video to be generated that includes images covering a particular timespan.

Some implementations can obtain multiple themes, and determine respective image criteria from a respective theme definition for each of the themes. Images associated with a user can be obtained from an image database and a subset of the images can be determined that meet the image criteria for the themes. A particular theme is selected from the multiple themes for the video, and a video is generated based on the selected theme, where the video includes images from the subset for the selected theme. For example, the particular theme can be selected based on a ranking of the themes, where the ranking can be based on engagement metrics for the themes, diversity metrics for the themes, and/or a user profile for a user who will view the video.

Various other features are described. For example, feedback related to the theme-based video can be received from the user (and/or other users), and a user engagement metric based on the feedback can be calculated. The feedback can indicate that the user shared the theme-based video, a count of user views of the theme-based video, that the theme-based video was deleted, and/or that the user accessed the theme-based video from a notification. The obtaining of the themes can be based on engagement metrics, in some cases. The soundtrack can be selected based at least in part on user profile information, which can include, for example, a user location and a user preference. In some examples, a confidence score can be determined based on the images and the theme definition and indicates a strength of match between the plurality of images and the image criteria, and the soundtrack can be selected based at least in part on the confidence score.

Other features can include displaying one or more selection options by a user device that allow a user to specify additional or different image criteria for selecting images for the video. For example, selection options can include one or more candidate images of the multiple images stored on the image database. A selection of a candidate image by user input specifies image criteria as indicated by the selected image, e.g., specifies a type of image content for the video that is the same as image content of the selected image, a subject of the video that is the same as the subject of the selected image, etc. Images are selected for the generated video that satisfy the user-specified image criteria. In some examples, the displayed candidate images are determined from the multiple available images based on existing stored image criteria, e.g., that is associated with a selected theme for the video.

One or more features described herein allow videos to be generated from user images and other content items based on particular themes that can be defined, selected, and utilized in a variety of ways. For example, diversity metrics, user engagement metrics, and other selection metrics can be used in the selection of themes. By using the different metrics individually or in combination as described herein, different themes can be utilized to generate theme-based videos. For example, using the engagement metric to select a theme can provide video themes that users find useful and interesting and which are more likely to be used to generate videos. In another example, using the diversity metric to select a theme can reduce a tendency of popular themes (e.g., themes with high engagement metrics) to dominate or crowd out other themes (e.g., newer themes, seasonal themes, etc.), and allows videos to be generated and viewed using a variety of different themes.

Use of video generation parameters and historical data can allow the system to suggest particular themes and/or generate videos at times and under conditions when particular themes may be suitable or particularly likely to provide a video that a user may enjoy. Soundtracks for the generated videos can be selected based on one or more of these parameters and metrics. Various customizations to a theme and generated video can automatically be made for a particular user. Using multiple of the described factors in combination can increase overall engagement of users with theme-based videos, and can simultaneously permit use of new or less used themes to determine if such themes are engaging to users. The theme-based videos generated using techniques described herein can achieve variety in video themes, promote new video themes, and retain user interest.

The described techniques allow reduction or avoidance of manual creation and editing of videos, such as in a traditional video creation interface. For example, automatic selection of images from a user's large collection of images based on a theme and image criteria for a video can save significant amount of time and system resources that would otherwise be needed to search for, select, organize, and edit the images to manually create a video. Consequently, a technical effect of one or more described implementations is that creation and display of theme-based videos is achieved with less computational time and resources expended to obtain results, including saving the processing and storage resources needed for browsing, selecting, copying, storing, sequencing, editing and/or combining the images included in a theme-based video that would otherwise be needed. For example, a technical effect of described features is a reduction in the consumption of system processing and storage resources utilized to create and edit theme-based videos than in a system that does not provide one or more of the described features.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The term video as used herein can include any collection of images, e.g., a sequence of images displayed in succession at a particular frame rate. For example, a video can include images that were continuously captured by a camera at a particular frame rate, and/or generated images provided in a sequence to be displayed as an animation. A video can include multiple video clips, e.g., generated from different sources. A video can include one or more still images that can be displayed for a particular period of time, e.g., a slideshow, and/or still images that are duplicated into multiple frames for display successively over the period of time at a particular frame rate. A video can include one or more cinemagraphs, e.g., animated GIFs (Graphics Interchange Format). A video can provide multiple images displayed simultaneously, e.g., in a collage. A video can include multiple types of these videos, e.g., displayed at different times during the duration of the display of the video.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 can also include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable device (e.g., handheld), cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. A client device can be a mobile device that can be any handheld or wearable device. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., server system 102). In some implementations, server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, video, audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, video sequences, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of image content data including images, video data, and other content as well as enable communication data, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as one or more display screens, projectors, etc. In some implementations, application programs running on a server system can communicate with a client device to receive user input at the client device and to output data such as visual data, audio data, etc. at the client device.

In some implementations, server system 102 and/or one or more client devices 120-126 can provide a display application and/or an editing application. The display application may allow a device to display image content such as theme-based videos as described herein. The application can allow a device to output various data, e.g., display video, images, text, and other data and output audio received by the client device running the application, where the video, images, and audio can be obtained from local and/or remote storage and/or over the network 130. The editing application can provide an associated user interface that is displayed on a display device associated with the server system or client device. The user interface may provide various display functions (e.g., display modes) for image content including theme-based videos, as well as editing functions, some of which are described herein. In some implementations, the user interface can receive user input that allows display and editing features as described herein.

Various implementations of some features described herein can use any type of system and/or service. For example, photo collection services or other networked services (e.g., connected to the Internet) can be used. Any type of electronic device can make use of features described herein. Some implementations can provide features described herein on client or server devices disconnected from or intermittently connected to computer networks. In some examples, a client device including or connected to a display device can process and display data stored on storage devices local to the client device (e.g., not connected via a communication network) and can provide one or more features and results as described herein that are viewable to a user.

Figure 2:
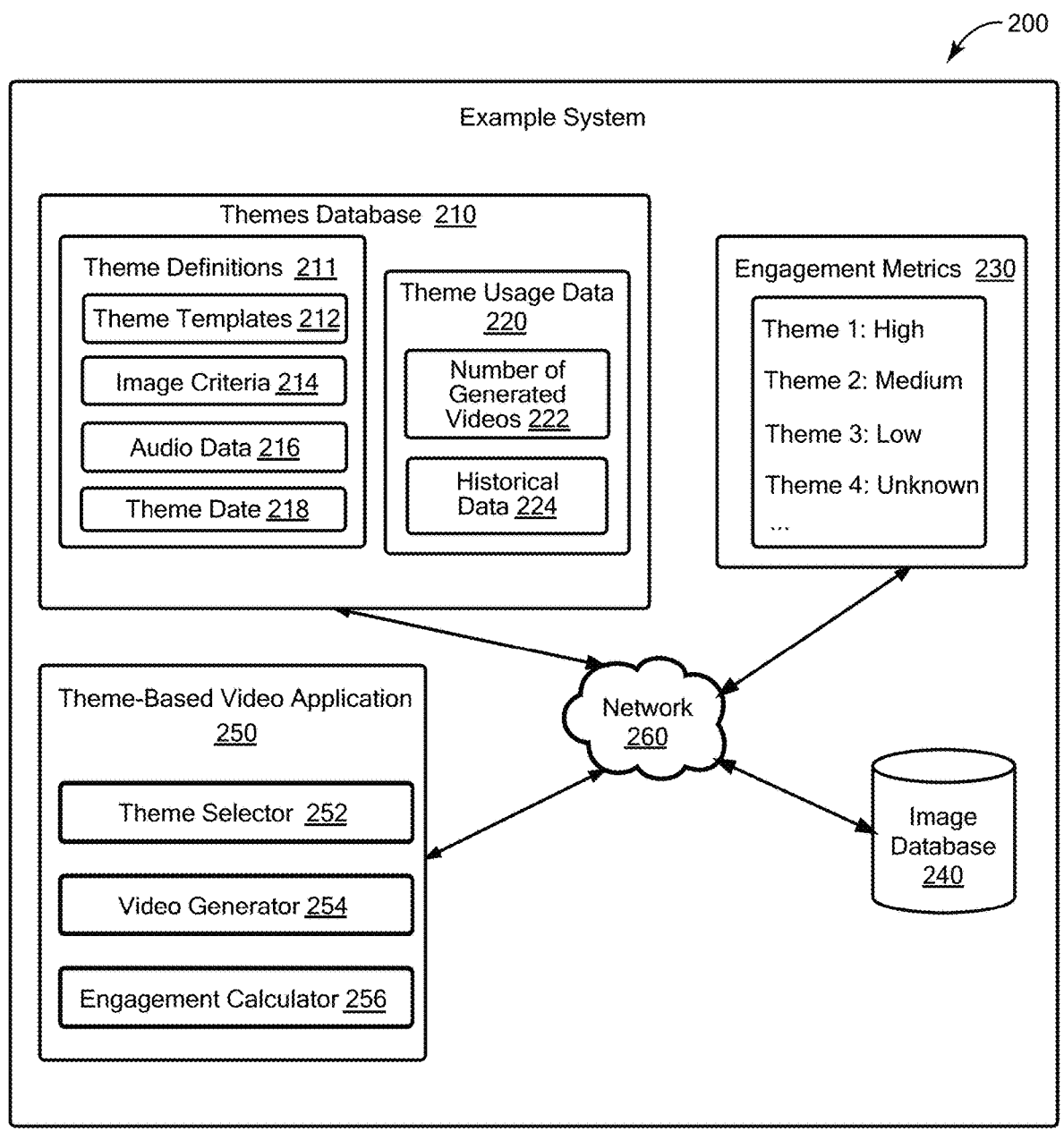
FIG. 2 is a block diagram of an example system that generates theme-based videos which may be used for one or more implementations described herein.

FIG. 2 illustrates a block diagram of an example of a system 200 that generates theme-based videos which may be used for one or more implementations described herein. The example system can be implemented on a single computing device, e.g., server device 104, or any of client devices 120-126, or on a plurality of computing devices coupled to each other over a network, e.g., network 130. The example organization or configuration of features shown in FIG. 2 can be varied in other implementations, e.g., combining different types of data into different single or multiple databases.

As shown in FIG. 2, themes database 210, engagement metrics 230, and image database 240 may be stored, e.g., in memory or storage device(s) of system 200. Further, a theme-based video application (program) 250 may be stored in the memory or storage device of system 200. In various implementations, the theme-based video application 250 accesses themes database 210, engagement metrics 230, and image database 240 over a network 260. In examples where system 200 is a single computing device, network 260 may be a system bus of the computing device. In examples where system 200 includes a plurality of computing devices, network 260 may be any type (or include multiple types) of computer network, e.g., a wired network, a wireless network, a virtual network, etc. Theme-based video application 250 may include one or modules, such as theme selector 252, video generator 254, and engagement calculator 256.

In various implementations, themes database 210 may include theme definitions 211 and theme usage data 220. Theme definitions 211 may include theme templates 212, image criteria 214, audio data 216, and theme date 218. In this example, each theme definition 211 can be considered a "theme" as referred to herein (theme usage data 220 can also be considered part of a theme in some implementations). A theme definition from theme definitions 211 can be used, e.g., by theme-based video application 250, to generate a video.

In various implementations, one or more theme templates 212 can be associated with each theme definition 211. A theme template 212 may specify various parameters for creation of a video based on an associated theme definition 211. For example, theme templates 212 may specify different durations for a video based on the theme, such as a minimum duration, a maximum duration etc. A theme template 212 can specify a frame rate for playback of a video (e.g., where slow motion or fast motion frame rates may be provided for particular themes). In another example, for videos based on user images, theme templates 212 may specify various parameters for transition between images, e.g., fade/dissolve, window, or other transition effects. In further examples, theme templates 212 may specify one or more effects (e.g., filters), e.g., sepia tint, particular color tint, black and white, change brightness, contrast, etc. to be applied to images that are included in a video based on the theme. In some implementations, application of such effects can be based on the detected content of the images (e.g., black and white filter for a desert scene, more saturation for a sunset, etc.). In another example, multiple images captured close in time can be used to generate a new image having a long-exposure effect or blur for moving objects within the depicted scene of the image. In still further examples, theme templates 212 may specify a title for videos, e.g., "Summer of Smiles," "First Day at School," "Ski Vacation," "My Trip to India," etc. In some examples, if user consent has been obtained, the title may be customized based on user profile data. For example, a user's name and/or a destination name (e.g., name of a geographical location) may be included for a travel theme that generates a video for the user's trip. For videos that include images that include motion, e.g., animated images, images with multiple frames, etc., the theme templates may specify parameters to be applied to such images, e.g., playback speed, audio to be played or muted, etc. Further, in some examples, theme templates 212 may specify parameters such as resolution, aspect ratio, etc. for videos based on the theme. The theme templates can specify particular portions of a generated video to which to apply particular parameters. For example, a theme template can specify a playback speed for the beginning of the video up to a particular time point, and then change the playback to have a different playback speed.

Image criteria 214 (e.g., image selection criteria) may be usable, e.g., by the theme-based video application 250, to select one or more images or videos, e.g., from image database 240, for inclusion in a theme-based video that is generated based on a theme definition 211. For example, one or more image criteria 214 can be associated with each theme definition 211 and can be used to select images for the associated theme definition 211. Image criteria 214 may include criteria based on image content (e.g., one or more image features depicted in images), criteria based on image metadata (e.g., data associated with an image including time of image capture, geographic location of image capture, etc.), criteria based on other data associated with an image (e.g., user data associated with a user who is associated with an image), etc. For example, image criteria based on image content for a theme can specify that images for a video based on the theme include at least one human face; an animal such as a pet; one or more natural landscape features such as snow, mountain, river, jungle, beach, sky, sunset, etc.; an object such as a vehicle, a ball, a surfboard, etc.; and so on.

In some examples, image criteria based on image content for a theme (e.g., theme definition 211) that specifies human faces can further include criteria such as one or more smiling faces, a face that shows surprise, a face with eyes open, etc. In some examples, where users provide consent for such use of their data, the image criteria can specify that one or more persons that are related to a user for whom the video is generated be present in an image, e.g., a family member, a friend, etc. In further examples, the image criteria can specify a pose, e.g., jumping, leaning, bending, etc. for one or more depicted persons. In still further examples, the image criteria can specify that the image include people wearing certain apparel, e.g., a wedding dress, sports attire, a type of footwear (e.g., hiking boots, soccer cleats, etc.) or eyewear (e.g., ski goggles, sunglasses, etc.), headwear (e.g., hats, bandana, etc.), or other objects worn by a person.

The image criteria may be associated with and/or based on a theme or theme type. For example, image criteria associated with a theme that relates to beaches may specify that an image that meets the criteria have one or more image features including an ocean, sand, beach chairs, people wearing swimwear, surfboard, boat, etc. In another example, image criteria associated with a theme that relates to a wedding may specify that an image that meets the criteria depict one or more image features including people in formal attire, a wedding cake, bridesmaids, people in dance poses, etc. In yet another example, image criteria associated with a theme that relates to mountain biking may specify that an image that meets the criteria depict one or more image features including a mountain, a bike, camping gear, a trail, trees, etc. In another example, image criteria associated with a theme that relates to pets may specify that an image that meets the criteria depict one or more pets (e.g., cats, dogs, birds in a cage, etc.) as image content features.

In some examples, image criteria may be based on image metadata in addition to, or alternative to, image criteria based on image content. Image criteria based on image metadata may include criteria based on geographical location of capture of the image; a type of device that captured the image, e.g., a smartphone, a video camera, a sports camera, etc.; a date and/or time of capture of the image; an aspect ratio, e.g., 4:3, 16:9, etc. of the image; a pixel resolution of the image; a camera setting, e.g., aperture, shutter speed, etc. at a time of capture of the image; and so on.

For example, image criteria associated with a theme that relates to summer can specify that an image that meets the criteria be captured on a date that falls within a predefined range of dates in a defined summer season. In another example, image criteria associated with a theme that relates to travel can specify that images that meet the criteria be captured at a variety of locations, and if the user permits use of user profile data, that the variety of locations be distinct from the user's home location (e.g., home town or city). In another example, a theme relates to a particular time period, e.g., college years, can specify that images that meet the criteria have been captured over a time period that matches the particular time period.

In various examples, image criteria can include criteria based on image content, image metadata, and a combination of image content and metadata. In some examples, image criteria may be specified for individual images. In some examples, image criteria may be specified for a group of images. In still some examples, image criteria may be specified both for individual images and for a group of images. For example, criteria for a group of images may specify that each image in the group include different image content, e.g., different people, to provide content diversity in the group of images selected for the theme. In another example, criteria for a group of images may specify that images in the group have been captured at different locations (e.g., outside of a threshold distance from each other's locations), to provide geographic diversity. In another example, criteria for a group of images may specify that images in the group have been captured within a particular distance of at least one other image in the group, and/or that images have been captured within a particular distance (e.g., radius distance) of a particular location such as the home, work, other commonly-visited location of the user, or other user-specified location (e.g., specified in stored user preferences or received user input).

In different examples, image criteria may be specified in different ways, e.g., binary criteria that are either met or not met by an image, probabilistic criteria, etc. In different implementations, weights may be assigned to different criteria and an image may be deemed to meet the criteria based on a combined weight of the criteria that are met. Selection of an image for a theme-based video may be based on whether the image meets the criteria, whether the image meets a weight threshold, etc.

Audio data 216 may include one or more audio tracks, or links to audio tracks for use in a video based on a theme. For example, audio data 216 may include a song that can be used as a soundtrack for the video. In another example, audio data 216 may include one or more sound clips that can be selectively combined to produce a soundtrack for the video. Audio data 216 may further include metadata that specifies characteristics of the song or the sound clips. For example, such metadata may include a soundtrack author, a location (e.g., a town, a district, a country, etc.) associated with the soundtrack author or other location associated with the authoring of the audio data, and/or a location associated with the subject matter of the audio (e.g., a place mentioned in the lyrics of a song), etc. In another example, such metadata may include one or more audio parameters, such as a mood (e.g., happy, sad, upbeat, excited, sinister, etc.), one or more musical characteristics (e.g., tempo, beat frequency, beat pattern, instruments used to create the audio, etc.), an artist (e.g., a singer, an instrumentalist, a composer, etc.). For example, one or more of such audio parameters can be associated with soundtracks by one or more users or soundtrack creators, while some can be assigned automatically by a system.

In different implementations, audio data 216 for a theme may be updated, e.g., to add a new song, new music, or new sound clips. For example, a theme author of the theme may add music to a theme, e.g., based on user feedback about movies generated using the theme. In another example, a new song may be added to a theme or replace an existing song of the theme, e.g., the new song can be a popular song that released recently, or was recently licensed for use in theme-based videos. Updating audio data 216 to incorporate new songs, music, and sound clips can allow theme-based videos to achieve improved user-engagement, e.g., due to user perception of the theme as fresh or appealing.

In some implementations, theme definitions may include a theme date 218 for some or all of the themes. For example, a respective theme date 218 can be associated with each theme template, or a single theme date 218 can be associated with multiple theme templates. In some examples, the theme date may specify or indicate a particular time (e.g., date, date range, time of day, time range or time period, etc.) during which the associated theme(s) may be used to automatically generate videos by the system (such as by a server and/or client device) if user consent has been obtained to do so, e.g., according to one or more features described herein. For example, the particular time can be a particular holiday such as Hanukkah, Independence Day, Diwali, etc. A theme date can indicate a particular event that takes place on particular days, e.g., Super Bowl, Olympics, etc. In some examples, holiday themes can have theme dates specifying a particular holiday period, during which those themes can be used to generate videos. A theme of "a wonderful year" (e.g., providing images in a video having timestamps during the span of the previous calendar year) can have a theme date specifying the last week of a calendar year, such that its theme-based video is generated during that last week. A theme of "spring break fun" can have a theme date specifying "spring break" (which can vary for different users depending on their schedule) and used to generate videos during a period of time corresponding to spring break. Time-of-day themes can be used to generate videos at a particular time or time range, e.g., themes of "day summary" or "day in the life of a cat" can have theme dates at the end of the day to cause videos to be generated at the end of a day, etc. In some implementations, the theme date is used to indicate a particular time during which a theme is determined or selected. For example, during the theme date, the system can score a theme using theme selection criteria (selection criteria or selection parameters) and, if the score satisfies a threshold, include the theme in a list or menu that is displayed on a user device. User input can select one or more themes from the displayed list or menu.

Some implementations can store a theme location (not shown) in association with some or all of the themes. In some examples, the theme location may specify or indicate a particular geographical location of a user device of a user, where the associated theme may be used to generate videos by the system (such as by a server and/or client device), e.g., according to one or more features described herein, while the user device is located at that location (e.g., as determined by location sensors on the device such as GPS sensors). For example, the theme location may be any location away from a designated "home" location of the user, such that when the user device and user are located away from the home location, a video may be generated by features described herein. In another example, the theme location may be a designated home of a friend, a park, a shopping district, etc., as determined by the system using accessible map data. In some implementations, the theme location is used to indicate a particular user device location at which a theme is determined or selected, e.g., to be displayed in a list or menu and eligible for selection by user input for the generation of a video.

In some implementations, theme usage data 220 may include a number of generated videos 222 and historical data 224. The usage data 220 can be associated with a particular theme definition 111, e.g., indicating usage data for videos that have been generated using that theme definition 111.

For example, the number of generated videos 222 for a theme may indicate a count of videos that were generated using the theme, e.g., by system 200. In some examples, where users consent to use of user profile data, the number of videos may indicate a count of videos that were generated using the theme for a particular location, e.g., city, state, country, continent, etc.; for a particular type of user, e.g., based on user age group, gender, or other demographic information; for a particular time period, e.g., within the previous hour, within the last day, within the last week etc. In various examples, the number of generated videos may be utilized to determine a level of usage of the theme by one or more users (e.g., if users' consent has been obtained, by general users of a system or service, and/or by a particular user).

Historical data 224 for a theme may indicate a prior usage history for the theme, e.g., over a period of time, if user consent has been obtained to track such usage. In some examples, historical data 224 for a theme may indicate a particular period during which particular numbers of videos that used the theme were generated, e.g., summer, winter, last day of October, etc. in prior time periods. For example, historical data 224 may indicate that more videos for a college graduation theme were generated during May but less numbers were generated during October. In another example, more videos of a "Skiing highlights" theme may be generated on certain days of the week, e.g., on a Monday following a long weekend in the winter, etc. In some implementations, historical data 224 can include numbers and dates for viewing particular generated videos. Historical data 224 may indicate patterns or trends in usage or popularity of various themes by one or more users.

In some implementations, in addition to themes database 210, engagement metrics 230 may be stored. Engagement metrics may be indicative of a degree to which a video generated using a theme engaged one or more users, e.g., was favorably viewed or rated by one or more users. In some implementations, engagement metrics 230 may be based on explicit and/or implicit user feedback when a user permits use of their feedback data. For example, explicit user feedback can include a user providing user input in response to prompts requesting the user's opinions, ratings, and/or comments related to the video. Implicit user feedback can include user actions performed with a device relating to the video, e.g., selecting the video to be displayed, the length of time the video is displayed before the user pauses or stops the video, the length of time the user retained the video in a user playback list, folder, or archive, an indication of whether the user has deleted the video and the length of time between obtaining the video and deleting it, etc.

In the example shown in FIG. 2, engagement metrics are shown as single words, e.g., Theme 1 has an engagement metric "High," indicating that videos based on Theme 1 are highly engaging to users. Theme 2 has an engagement metric "Medium," indicating that videos based on Theme 2 are somewhat engaging to users. Theme 3 has an engagement metric "Low," indicating that videos based on Theme 3 are not engaging to users. Theme 4 has an engagement metric "Unknown," indicating that engagement metrics have not yet been determined for videos based on Theme 4.

In different implementations, engagement metrics may be expressed and stored in other ways, e.g., as numeric values, e.g., on a scale of 1-10, on a scale of 1-5, etc.; as percentage of users, e.g., 90% users found videos based on a theme engaging; as percentile values, e.g., videos based on a theme were in top 20% of all theme-based videos; and so on. In some implementations, user feedback may be stored, and engagement metrics may be calculated, e.g., on demand or periodically, for generation of theme-based videos, for ranking themes, etc.

Engagement metrics may be utilized to generate and provide theme-based videos to users, as described with reference to FIGS. 3 and 4 below.

In various implementations, image database 240 stores images, e.g., associated with one or more users of system 200. In different implementations, image database 240 may store any type of image, such as a static image (e.g., a photograph, a drawing, etc.), an image that includes motion (e.g., a cinemagraph, a live photo, a video segment, clip, or snippet, etc.), etc. In some implementations, image database 240 may include additional information about one or more stored images. For example, image database 240 may store one or more descriptors, e.g., tags or labels, associated with images. In various examples, tags may include metadata about the associated image, such as a date/time of capture, a location of capture, a type of camera (e.g., a smartphone camera, a life-logging camera, an activity camera, etc.) that captured the image, etc.

Tags may include descriptors related to image content of the image, e.g., identifying or describing image features such as objects, persons, places, or other features depicted in the image, and/or ratings and comments for such image features. In some implementation, if the user consents to such analysis, tags may be automatically determined based on analysis of the image and/or image metadata. For example, automatically determined tags may include identification of one or more landmarks in the image, detection of faces (e.g., based on general facial features without identifying the persons), identification of one or more users who appear in the image (e.g., if those users consent to use of techniques such as facial recognition, emotion detection in faces based on facial landmarks such as shape of mouths, eyes, etc., object recognition, and/or other image recognition techniques, etc.), identification of an event depicted in the image (e.g., graduation, wedding, dance recital, etc.), identification of colors in the image (e.g., saturated, high-dynamic range, predominantly red, etc.), identification of one or more objects in the image (e.g., sun, flowers, fruit, animals, etc.), and the like. Image database 240 may be queried, e.g., by theme-based video application 250, and may provide one or more images, included metadata, and automatically determined tags.

In some implementations, the tags and/or metadata may be associated with scores, e.g., that indicate a likelihood of the tag being correctly determined and applied to the image (correctly identifying image features depicted in the image). Such scores can be considered confidence values in some implementations. For example, an image may have a high score for the tag "mountain" if a mountain is detected as a feature in the image, but a lower score for the tag "Mount Everest" if the likelihood of the detected mountain to be Mount Everest is determined to be lower (e.g., distinguishing features for Mount Everest were not or only partially detected in the image). In another example, when users consent to use of facial recognition techniques, an image may have a high score for a particular user's name, if the facial recognition matched a significant number of facial features, and a lower score, if the facial recognition matched a small number of facial features.

In various implementations, system 200 can include a theme-based video application 250, as shown in FIG. 2. Theme-based video application 250 can include one or more modules, such as theme selector 252, video generator 254, and engagement calculator 256.

Theme selector 252 can utilize themes database 210, including theme definitions 211 and theme usage data 220, to select a theme for a video. For example, theme selector 252 can select a particular theme to generate a video. In some examples, the theme selector 252 can select a theme definition 211 (and theme usage data 220, in some implementations) when selecting a theme. Theme selector 252 may implement any suitable techniques to select the particular theme. In some implementations, theme selector 252 can select multiple themes, e.g., to generate a video having images related to any of the selected themes, or to all of the selected themes. FIG. 4 illustrates an example method 400 to select themes.

Video generator 254 can generate videos based on a selected theme. Some examples of video generation are described below with reference to block 322 of FIG. 3.

Engagement calculator 256 can utilize implicit and/or explicit user feedback with a user's consent to determine engagement metrics for videos generated by system 200. Examples of determination of engagement metrics are described below with reference to blocks 326 and 328 of FIG. 3. For example, engagement calculator 256 can store engagement metrics 230.

Figure 3:
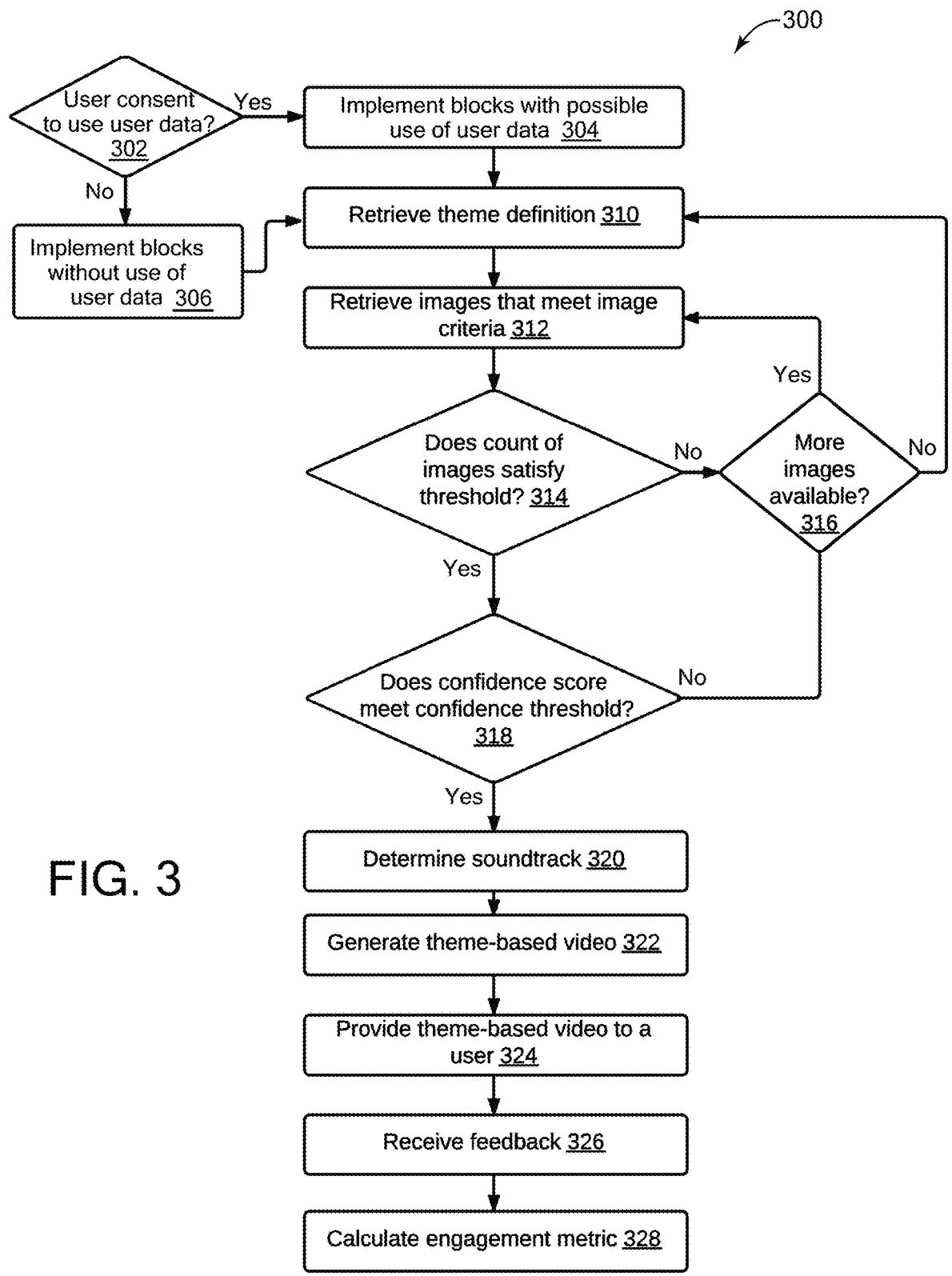
FIG. 3 is a flow diagram illustrating an example method to generate a theme-based video, according to some implementations.

FIG. 3 is a flow diagram illustrating an example method to generate a theme-based video, according to some implementations. In some implementations, method 300 can be implemented, for example, on a server system 102 as shown in FIG. 1, or by a system 200 as shown in FIG. 2. In some implementations, some or all of the method 300 can be implemented on a system such as one or more client devices 120, 122, 124, or 126 as shown in FIG. 1, and/or on both a server system and one or more client systems. In described examples, the implementing system includes one or more hardware processors or processing circuitry, and one or more storage devices such as a database 106 or other accessible storage. In some implementations, different components of one or more servers and/or clients can perform different blocks or other parts of the method 300.

In block 302, it is checked whether user consent (e.g., user permission) has been obtained to use user data in the implementation of method 300 (and method 400, described below). For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated and/or accessed by a user, videos viewed or shared by a user, etc. One or more blocks of the methods described herein may use such user data in some implementations. If user consent has been obtained from the relevant users for which user data may be used in the method 300, then in block 304, it is determined that the blocks of the methods herein can be implemented with possible use of user data as described for those blocks, and the method continues to block 310. If user consent has not been obtained, it is determined in block 306 that blocks are to be implemented without use of user data, and the method continues to block 310. In some implementations, if user consent has not been obtained, blocks are to be implemented without use of user data and with generic or publicly-usable data.

Theme-based videos can be generated in a variety of contexts. In some examples, theme-based videos can make use of images data from an image database 240, examples of which are described for FIG. 2. For example, image database 240 may be a personal image library (e.g., a photo library) of a particular user, and theme-based videos may be generated and provided to the particular user automatically, upon consent from the particular user. In another example, image database 240 may be a shared library of images, e.g., a shared photo album, a photo stream, etc. In this example, consent may be obtained from one or more users, e.g., owners of one or images in the shared library, and a theme-based video may be generated and provided to users that have access to the shared library.

In some implementations, access to theme-based videos can be provided specifically to those users that have access to the images in the image database 240 that are used in the theme-based video. In some implementations, access to theme-based videos may be provided based on user input, e.g., a user may be provided a user interface to share the theme-based videos with other users. In some implementations, if the user provides permission to customize theme-based videos using user profile information, a theme-based video may be generated based on user profiles.

In block 310, a theme definition, e.g., from theme definitions 211, is obtained. For example, one or more theme definitions 211 for a selected theme may be retrieved from a database. In different implementations, a theme may be selected in a variety of ways. For example, a theme may be selected based on popularity, a date of creation or update of the theme, comparison of a current date (e.g., a date on which the theme-based video is to be generated) with a theme date, comparison of a current location of a user device with a theme location (e.g., a location at which the theme-based video is to be generated), a user preference, and/or other factors. FIG. 4 illustrates one example of a method to select a theme.

In block 312, images that meet image criteria 214 from the theme definition are obtained from an image database (e.g., a collection or other store of images). For example, images may be retrieved e.g., by querying stored images in image database 240 for images that meet image criteria, e.g., image criteria 214. In some implementations, obtaining images can include querying image database 240 for metadata and/or tags associated with stored images to identify one or more images that match image criteria 214. Obtained images can be associated with the user, e.g., uploaded by, captured by, received by, viewed by, stored by, or otherwise associated with the user. In some implementations, obtained images can be associated with other accessible sources or databases (e.g., publicly-accessible images, etc.).

In some implementations, obtaining images can include analyzing pixels (e.g., pixel values) of images based on the image criteria, or instructing a different process to analyze the pixels of the images, and retrieving images that meet the criteria. For example, one or more image criteria may include image content features that are to be searched for in images associated with the user. Image detection or image recognition techniques can be used to detect or recognized image content features in the images. For example, various image recognition and detection techniques can include machine learning based on training images, comparison to reference features in reference images, etc. to detect image features.

In some implementations, the obtained images can include video segments or other animation types of images that include multiple image frames.

In some examples, if the theme is related to graduation from a school, image database 240 can be queried to retrieve images that are associated with one or more tags related to such a graduation (e.g., "graduation," "college," "high school," "diploma," "commencement," etc.). In another example, if the theme is related to skiing, image database 240 may be queried to retrieve images that are associated with one or more tags related to skiing (e.g., "snow," "ski slope," "ski resort," "downhill," etc.). In another example, if the theme is related to aerial views captured by a drone, image database 240 may be queried to retrieve images that have metadata indicative of a drone-mounted camera, and with tags potentially indicative of aerial views, e.g., "helicopter," "bird's eye view," etc. In another example, if the theme is "a day in the life of a person," or "day in the life of a dog/cat" and if the user's consent has been received for use of user data, image database 240 may be queried to retrieve images that have associated tags that indicate presence of the person or animal in the images (e.g., any person or animal or a particular person or animal—as specified by image criteria), and that are associated with metadata that indicate that the images were captured on a same day. In some examples, other or more complex image criteria, based on image content and/or metadata may be specified.

In block 314, it is determined whether a count of images obtained in block 312 satisfies a threshold. In some implementations, the threshold can be indicated by the image criteria used in block 312, and in some cases can include multiple sub-thresholds. For example, image criteria 214 may specify that, for the theme "a day in the life of a person," a minimum of 5 images (threshold is 5 images) are to be retrieved that satisfy the (other) image criteria 214 for the theme, to generate a video based on the theme. In another example, image criteria 214 may specify that for a theme related to weddings, at least two images of the bride and groom dancing, at least one image of a wedding cake, and at least 10 other images taken at the same event are to be retrieved to generate a video based on the themes. In this example, the threshold for the theme includes three sub-thresholds, e.g., a sub-threshold for each type of image content. In other examples, the threshold may specify other image count criteria, e.g., based on theme definitions 211. In some implementations, for the count of images used in block 314 with respect to retrieved video or animation segments, the system can count a particular segment of video data (e.g., multiple successive image frames) as a single image. In some implementations, every predetermined time period (e.g., every 3 seconds) of a video segment, or every set of a number of video image frames (e.g., every 5 frames), can be counted as a single image for block 314.

In some implementations, if it is determined that the count of images does not satisfy the threshold, the method proceeds to block 316, described below. If it is determined that the count of images satisfies the threshold, the method proceeds to block 318, described below.

In block 316, in some implementations it is determined if more images are available in image database 240. If it is determined that more images are available, the method proceeds to block 312 to determine whether one or more images can be found and obtained that meet image criteria for the theme. If it is determined that more images are not available, or that no more images meet the image criteria, then in some implementations the method proceeds to block 310 to retrieve a theme definition for a different theme, and a video having the different theme can be attempted to be generated.

In some implementations, if it is determined that the count of images does not satisfy the threshold, and that more images are not available for retrieval, then the system can retain in storage references (e.g., identifications) of the images that have been retrieved that meet the image criteria, and can wait for additional images to become accessible to the method 300. For example, over time, additional images can be captured and/or transmitted to the image database 240 by the associated user(s), and these new images can be obtained for the use of method 300. For example, newly accessible images may be tested for the image criteria of the obtained theme periodically, in response to the new images becoming accessible, and/or based on other conditions. If enough new images meet the image criteria such that the count of images now satisfies the threshold in block 314, then the method proceeds to block 318.

In block 318, it is determined if a confidence score calculated based on the obtained images meets a confidence threshold, e.g., based on a match of the obtained images to the theme definition. For example, the confidence score can indicate a strength of the match between the obtained images and the theme's image criteria. In some examples, obtained images may have a strong match to a theme definition if the images are associated with tags that match corresponding tags or labels of the image criteria, and if the tags have strong scores (e.g., high scores) indicating that the tags are strongly matched to image content of the associated image. For example, for a tag resulting from automatic generation by a system, having a strong score indicates there is high confidence that the tag correctly describes image content of its associated image. Furthermore, tags can have strong scores if the tags were input by a user. For example, if the theme is related to skiing, and some obtained images are associated with tags such as "ski slope" and "ski resort" that are a strong match to the image criteria of the theme and have strong scores, a high confidence score may be determined. If obtained images are associated with tags such as "snow" and "mountain" that have a strong score, but are not associated with skiing-specific tags, a lower confidence score may be determined.

In some implementations, an individual confidence score can be determined for each of the obtained images, and the individual confidence scores are combined (e.g., summed and/or averaged) to determine an (overall) confidence score for the set of retrieved images. In some implementations, the overall confidence score is compared to the confidence threshold in block 318. Some implementations can compare each individual image confidence score to the confidence threshold. For example, in some implementations, if any individual confidence score does not meet the confidence threshold, the test can be considered a negative result. Some implementations can discard any image whose individual confidence score does not meet the confidence threshold.

If the confidence score meets the confidence threshold, the method proceeds to block 320 to continue generating the video. If the confidence score does not meet the confidence threshold, the method proceeds to block 316 to determine if more images are available.

In block 320, a soundtrack for the theme-based video can be determined. For example, audio data 216 from theme definitions 211 may be used to determine the soundtrack. In some examples, the soundtrack may be determined at least in part based on the confidence score determined in block 318. For example, if it is determined that there is strong match, e.g., as indicated by a high confidence score, a soundtrack that expresses the theme strongly may be selected as the soundtrack for the theme-based video. In different implementations, the confidence score may be compared with one or more thresholds to determine the soundtrack. In some implementations, the thresholds may be included in the theme definitions, e.g., in audio data 216.

For example, if the confidence score indicates a strong match between the theme "day in the life of a person" and the obtained images, a soundtrack that includes various sounds suitable for that theme can be selected for use. In some examples, determining such a soundtrack can be based on metadata or tags of the obtained images and metadata that specifies characteristics of songs or sound clips associated with the theme in audio data 216. For example, for the "day in the life of a person" theme, one or more sound clips associated with tags that match the person's mood in the obtained images, as indicated by image metadata, can be used to generate the soundtrack. In some examples, tags that indicate a happy emotion for a depicted person in the images can cause a strongly happy musical sound clip to be selected, e.g., from one or more available soundtracks stored in particular categories such as emotions or moods, pacing (fast or slow), types of image features, etc. In another example, if it is determined, based on the metadata or content of the images, that at least one image is taken towards the end of a day and is associated with a sleeping person or baby, a lullaby may be selected and used in the generated video.

In some implementations, if the confidence score does not indicate a strong match between the theme and the obtained images, a different soundtrack based on audio data 216 may be used for the theme-based movie. For example, if the obtained images depict a person, but the indications of mood, sleeping state, etc. are not available, instrumental music that is identified in the audio data 216 may be used, e.g., more generic music. In some examples, if the confidence score falls below a minimum threshold, no soundtrack may be included.

In some implementations, available stored soundtracks may be associated directly with particular themes, e.g., in stored data associating particular themes with particular soundtracks, or associating particular theme characteristics with particular soundtrack characteristics. For example, a theme data, theme title, or other theme characteristics can be associated with particular soundtrack characteristics, e.g., metadata and/or categorization of a soundtrack that indicates the soundtrack is "happy," "sad," "upbeat," "slow," etc. A soundtrack that is associated with a selected theme can be selected in block 320. In some implementations, such as those implementations that do not include a soundtrack with a video, block 320 may not be performed.

In various implementations, soundtracks can be selected based on diversity (e.g., to include a variety of types of soundtracks in successive generated videos), image content features of images meeting the image criteria for the theme, frequency (number of times above a threshold) or recency (within a threshold time period of the current time) that the soundtrack was played by the user on a user device (as determined with user consent), etc. In another example, one or more soundtracks that were played by the user on a user device within a threshold time that the images selected for the video were captured, can be selected for the video. The method proceeds to block 322.

In block 322, the theme-based video is generated. For example, the theme-based video may be generated by video generator 254, e.g., using the qualifying images resulting from blocks 312, 314, and 318, e.g., that meet the image criteria and other conditions, and using the soundtrack determined in block 320. In some implementations, theme definitions 211 may be utilized to generate the theme-based video. For example, video generator 254 may generate a video of a particular duration, based on the theme for the video. In another example, particular effects, such as cropping, filtering, adding a frame, deleting one or more frames, etc. may be applied to the obtained images before the images are included in a theme-based video, e.g., based on theme templates 212. For example, filters that adjust brightness, contrast, color, saturation, or other image characteristics can be applied to one or more images. In some implementations, video generator 254 may include a particular number of images, process selected images to identify and remove duplicates, etc. based on image criteria 214.

In some implementations, video generator 254 may determine to include particular images of the qualifying images for the video and/or organize a particular order or sequence of the qualifying images in the video, according to general rules for generating videos, stored user preferences, and/or particular rules associated with and specific to the obtained theme. For example, a theme that is oriented to presenting images of the children of a parent in a generated video can specify (e.g., in a theme definition or template) to select a number of qualifying images such that an equal number of images depicts each child. In some cases, the theme can specify to arrange the qualifying images such that images of each child are present in particular specified portions of the video, e.g., at the beginning, middle, and end of the video sequence.

Further, in implementations where block 320 is included (e.g., where the video includes a soundtrack), the soundtrack generated in block 320 is added to the video. In some implementations, images in the generated video can include segments of video data and/or animated images (e.g., cinemagraphs), e.g., where in some cases the generated video may include a mix of still images and segments of video and/or other animations. For example, a plurality of image frames can be included that are to be displayed at a particular frame rate to present an animation, e.g., animated motion of image features or other image content. A segment of video or other animation can be designated to be displayed at their original frame rate in the generated video, or can be adjusted to a different frame rate for display in the generated video.

In some implementations, characteristics of the soundtrack, such as beat pattern, can be matched to transitions between images in the video based on theme templates 212 and audio data 216. For example, image transitions (e.g., displaying a next image in place of a previous image, e.g., via dissolves, fades, etc.) in the theme-based video may be arranged such that the transitions match the soundtrack as based on an examination of the audio data of the soundtrack. For example, image transitions may correspond in timing and/or length to a beat pattern, length and timing of notes or chords, a tempo, and/or other musical characteristics of the soundtrack. In some implementations, a number of images, and/or a length of displaying images, included in the theme-based video may be determined based in part of one or more characteristics of the soundtrack. For example, the number of images can be based on a length and/or a tempo of the soundtrack, a number of sound clips included in the soundtrack, and/or other characteristics of the soundtrack.

In implementations where a user has provided permission to generate theme-based videos based on user profile information, one or more users for the theme-based video may be identified. For example, a user for the theme-based video may be an owner of images that are used in the video, or another user that can access the images. In different implementations, user profile information may be provided explicitly by the user, or determined based on user data. For example, a user may provide a user preference for certain types of music, e.g., jazz, rock, Indian classical, etc. In another example, user data may indicate that the user has playlists or music purchases for musical genres including classic rock and hip-hop. Such user profile information may be utilized to determine a user preference, e.g., for certain kinds of music. The user preference may be matched with an audio parameter, e.g., of sound clips identified in audio data 216 for the theme to determine a soundtrack for the theme-based video.

In some implementations, user profile information and/or image metadata may include one or more locations associated with the user. For example, user profile information such as check-ins or reporting of locations visited by the user, favorite map locations, favorite travel destinations, etc. and image metadata, such as locations associated with images, may indicate that the user travelled to one or more locations. In this example, if user consent has been obtained, one or more user locations may be determined and compared with a location parameter of the soundtrack. For example, audio data may include a number of soundtracks, each associated with a particular location, such as a city, country, continent, etc. In these implementations, a soundtrack may be selected based on the user location. For example, if the theme-based video is based on a theme "My Trip Through Europe," and the user profile information indicates that different subsets of the retrieved images were taken in Italy, Spain, and Greece, the soundtrack may be selected such that Italian music is used for the portions of the video that feature images captured in Italy, Spanish music is used for the portions of the video that feature images captured in Spain, and Greek music is used for the portions of the video that feature images captured in Greece.

In block 324, the theme-based video is provided to a user. In some implementations, one or more users to whom the theme-based video may be provided are identified. In some implementations, the theme-based video may be provided to one or more users that are associated with a plurality of images that are in the image database that are obtained for generating the theme-based video. For example, a user may be associated with the plurality of images if the user is an owner of the images, e.g., if the user added the images to the image database by storing the images in the database, uploading the images to the database, etc.

In another example, a user can be associated with the plurality of images if the images are shared with the user, e.g., as part of a photo library, in a shared image stream, via a messaging application such as a chat application, via email, etc. In another example, when the user consents to such use of user data, a user may be associated with the plurality of images based on determination that the user is depicted in at least a subset of the plurality of images, e.g., based on image metadata, based on image content, etc.

In different implementations, the theme-based video can be provided to a user via a notification in various ways. For example, a notification of the theme-based video may be provided by a software application that handles photo management for the user, e.g., as a displayed notification on a display screen of a device used by the associated user, as an audio and/or haptic feedback notification output from the device, etc. In another example, the notification may be provided as an operating system alert. In another example, the notification may be provided through a messaging application, via email, as a social network notification, etc. In some implementations, when a user selects a displayed indicator of the notification, e.g., a button or link displayed on a display screen, the theme-based video may be output to the user (e.g., images displayed on a display screen and audio output by device speakers) as a streaming video, a downloadable video, etc.

In some implementations, the theme-based video can be automatically added to a user's library of images, e.g., in response to the user selecting the notification, or automatically. In different implementations, options may be provided to the user to edit the theme-based video, e.g., to add or remove portions of the video (such as one or more images or image frames in the video), to change or adjust the music, to add effects, etc. In some implementations where the user is provided options to edit the theme-based video, user permission may be obtained to update image criteria, e.g., image criteria 214, based on editing operations performed by the user. For example, it may be determined that a substantial number of users removed portions of a video based on a theme "wedding celebrations" that did not include one or more human faces. Image criteria 214 for the theme may be adjusted such that images that do not depict human faces are not included in videos based on the theme.

In some implementations, the theme-based video can include a post-roll portion. For example, the post-roll portion may depict a source of the theme-based video, e.g., a photo management application or service that generated the theme-based video. In another example, the post-roll portion may depict a soundtrack author of the soundtrack, e.g., a composer, singer, musician, or band that produced a song or portion that is included in the soundtrack of the theme-based video. In yet another example, the post-roll portion may depict a theme author of the theme, e.g., an individual or company, that provided the theme definition for the theme of the theme-based video. The method proceeds to block 326.

In block 326, user feedback about the theme-based video can be received. User feedback may be received and used specifically upon the user's consent for such collection and use of data. For example, user feedback can include information indicating that the user selected a notification about the theme-based video, that the user viewed at least a portion of the video (and the time period of viewing), that the user repeated one or more views of at least a portion of the video, that the user shared the video with one or more other users, etc. User feedback can include explicit and/or implicit user feedback as described above. In some implementations, engagement calculator 256 may implement block 326. The method proceeds to block 328.

In block 328, the received user feedback can be used to determine engagement metrics 230 for the theme of the theme-based video. In some implementations, engagement calculator 256 may implement block 328.

For example, user feedback may be determined based on the user device displaying and/or the user viewing at least a portion of the generated video. For example, explicit user feedback may be received as user input provided by the user, e.g., during or after display of the generated video.

In some implementations, user feedback can be received that includes a rating indicator that indicates a rating for the video or portion of video that the user is viewing. For example, user input can be selection of a control or icon that indicates a favorable or unfavorable rating by the user, etc.

In some implementations, if a user views an automatically generated video (e.g., views more than a threshold portion or percentage of the video, views the video from start to finish, etc.), implicit user feedback can be received that includes a view indicator. Reception of a view indicator can be an indication of positive engagement of the user. In some examples, the view indicator may also include a count of views, e.g., a number of unique viewers for the video, a number of times the video was viewed, etc. In these examples, the view indicator may be an indication of a level of positive engagement.

In another example, user feedback can be received that includes a share indicator that indicates whether the user shares an automatically generated video, e.g., with one or more other users via chat, email, social networks, etc. Reception of the share indicator may also be an indication of positive engagement. In some examples, the share indicator may include a count of the number of times the video was shared.

In still some examples, user feedback can be received, e.g., as a deletion indicator that indicates that a user may have deleted a portion of an automatically generated video. The deletion indicator may be an indication of that portion not being engaging. In further examples, a user may ignore the video (e.g., not click on a notification to view the video, nor otherwise select to view the video in response to the notification). A notification response indicator may indicate whether the user engaged with a notification about the video, e.g., an email notification, an in-app notification in an images application, a notification sent via a messaging app, etc. A notification response indicator can indicate that the user ignored the video, which may be an indication of a lack of (e.g., negative) engagement.

Engagement metrics are determined or calculated based on such user feedback and can be associated with the obtained theme, with the generated video, and/or with the user if user consent has been obtained. The engagement metric can be used to determine one or more themes, image criteria, and/or other characteristics for later-generated videos as described herein. In some implementations, one or more existing engagement metrics associated with the theme are adjusted based on the user feedback, e.g., to indicating greater or lesser user engagement with the theme as based on the particular user feedback.

In some implementations, engagement metrics can be shared, e.g., with an author of a theme or administrator of themes. For example, a theme author may utilize engagement metrics to determine, e.g., various parameters related to the theme, such as a time period (day of the week, time of day, etc.), a geography (e.g., state, country, etc.), demographic (when users permit use of such data) that found the theme engaging or not engaging. A theme author may adapt the theme, e.g., by updating theme templates 212, image criteria 214, audio data 216, and theme usage data 220, based on engagement metrics.

Figure 4:
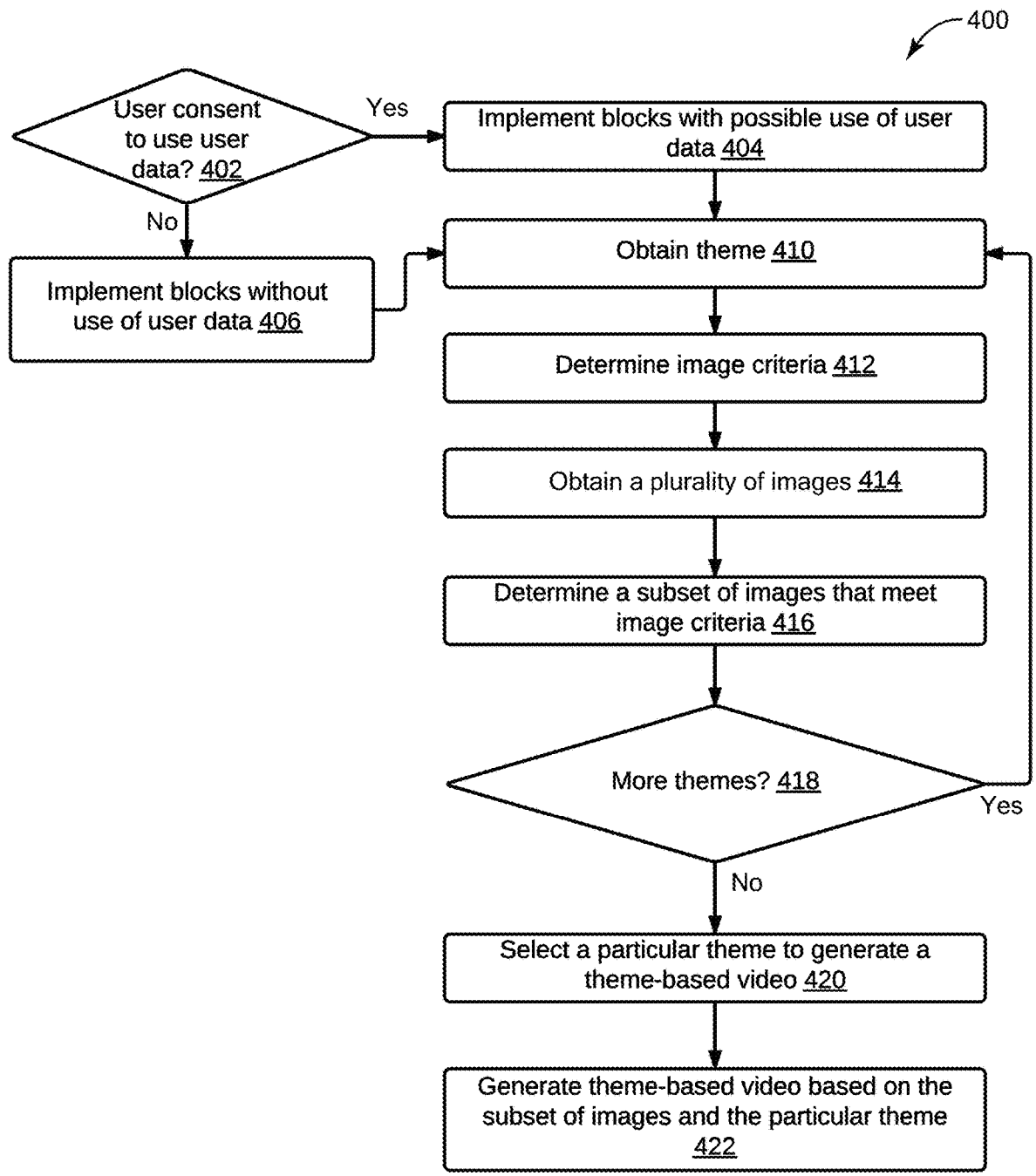
FIG. 4 is a flow diagram illustrating an example method to select a theme to generate a theme-based video, according to some implementations.

FIG. 4 is a flow diagram illustrating an example method to select a theme to generate a theme-based video and generate the video, according to some implementations. In some implementations, method 400 can be implemented, for example, on a server system 102 as shown in FIG. 1, or by a system 200 as shown in FIG. 2. In some implementations, some or all of the method 400 can be implemented on a system such as one or more client devices 120, 122, 124, or 126 as shown in FIG. 1, and/or on both a server system and one or more client systems. In described examples, the implementing system includes one or more hardware processors or processing circuitry, and one or more storage devices such as a database 106 or other accessible storage. In some implementations, different components of one or more servers and/or clients can perform different blocks or other parts of the method 400.

In block 402, it is checked whether user consent (e.g., user permission) has been obtained to use user data in the implementation of method 400 (and method 300, described above). For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated and/or accessed by a user, videos viewed or shared by a user, etc. One or more blocks of the methods described herein may use such user data in some implementations. If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, blocks are to be implemented without use of user data and with generic or publicly-usable data.

In block 410, one or more themes can be obtained, e.g., theme data for a theme can be retrieved or received from themes database 210 of system 200. In some implementations, block 410 can be performed in response to the system automatically determining that one or more themes are to be created and/or one or more videos are to be automatically generated, as described below. In some implementations, block 410 is performed in response to user input received by a user device, e.g., selection by the user of a displayed control to cause a video to be generated and/or one or more themes to be obtained.

In some implementations, themes database 210 may be queried to determine available themes. Further, in some implementations, the one or more obtained themes are selected from the available themes based on one or more theme selection criteria. The theme selection criteria can include determined metrics, one or more predefined conditions being met, etc. For example, in some examples, the selection of one or more themes obtained in block 410 can be based on one or more generated videos that have previously been generated.

In some implementations, the theme selection criteria can include checking a respective engagement metric for one or more (or each) of the available themes. For example, a respective engagement metric may be determined for each of the available themes, e.g., by querying engagement metrics 230. In these implementations, the themes to be obtained may be based at least in part on the respective engagement metric for each available theme.

In some implementations, themes can be obtained based at least in part on a diversity metric. A diversity metric can be used, for example, to obtain a theme that is different than themes used to generate previous videos, e.g., for the user.

In some implementations, the number of videos that were generated from one or more themes can be used to determine a diversity metric for a particular theme. For example, historical data 224 can be used in some implementations to determine the number of generated videos. Some implementations can also consider the time period in which the number of generated videos were generated for determining the diversity metric. For example, if the number of videos generated using a particular theme in a particular time period (e.g., the past hour) is greater than a threshold value (e.g., a thousand videos), a diversity metric for the theme may be set to a value, e.g., a value lower than a threshold diversity value. In another example, if a threshold percentage (e.g., 10%, 20%, etc.) of all theme-based videos that were generated in a particular time period (e.g., the past hour) used the particular theme, a diversity metric for the theme may be set to a value lower than a threshold diversity value. Such a low diversity metric value can be set to indicate that the associated theme was used to generate many videos in a recent time period. A low diversity metric for a particular theme can cause that theme to be skipped over and a different theme to be obtained in block 410. Similarly, the diversity metric for a particular theme may be set at a high value, e.g., if the number of videos generated for that particular theme is lower than a threshold value or percentage. For example, such a high value can cause the particular theme to be obtained in block 410, e.g., since fewer generated videos have recently been generated using the particular theme.

In some implementations, one or more other theme selection criteria (e.g. factors) can influence a particular theme to be obtained. For example, a selection metric or parameter can be assigned to a theme, and can be used similarly to the diversity metric to influence whether the theme should be obtained in block 410 (or in some implementations, the diversity metric can be used to adjust the selection parameter).

In some examples, a particular theme may be assigned a strong (e.g., high) selection parameter value if the current geographic location of the user matches a location associated with the particular theme, thus causing a greater likelihood that the particular theme will be obtained and a video generated based on that particular theme for display while the user is at that location. For example, some themes may be associated with particular locations, such as a vacation theme when the user is located at home (e.g., indicating that the user has returned home from the vacation and can view the generated video while at home). Similarly, a vacation theme may also be associated with hotel locations, where a user device can determine that the user is currently at a hotel based on local map or business data (if user consent has been obtained), such that the video can be generated for viewing by the user while at that hotel location.

For example, a particular theme may be assigned a strong (e.g., high) selection parameter value if the current date matches a theme date of the particular theme, thus causing a greater likelihood that the particular theme will be obtained and a video generated based on that particular theme. In some examples, a theme date can be July 4 for a theme that is associated with "U.S. Independence Day," and if the current date is July 4, the selection parameter for that theme is weighted higher. Similarly, the selection parameter for a particular theme can be assigned a low value if the current date does not match the theme date of the particular theme (e.g., if the current date is a date other than the specified theme date(s)). Similarly, a particular theme may be assigned a strong (e.g., high) selection parameter value if the current location of a user device of the user matches a theme location of the particular theme.

In some implementations, the selection parameter can have a higher weight than the diversity metric when determining whether to obtain a particular theme, e.g., if the current date matches the theme date of the particular theme. In some implementations, the selection parameter can be assigned this higher weight if the theme date occurs below a threshold frequency, e.g., occurs on 20% or fewer days of a year. This can indicate that the theme date occurrence is relatively rare and therefore its selection parameter is assigned a higher weight when the current date matches the theme date. In additional examples, a selection parameter of a theme can be set to a higher weight when the current date matches the theme date, even when the number of generated videos for the theme is high and the diversity metric for the theme is low. Similarly, the selection parameter can have a higher weight than the diversity metric when determining whether to obtain a particular theme, e.g., if the current location of a user device matches the theme location of the particular theme. In some implementations, if user consent has been obtained, the selection parameter can be assigned the higher weight if the theme location is visited below a threshold frequency by the user and user device over a particular period such as a year (determined based on stored user location data, if user consent has been obtained).

In some examples, a theme date can indicate a type of event, such as a wedding, a graduation, a birthday, an anniversary, etc. for which the theme can be used to produce videos. Such a theme date can be used to determine whether such an event is occurring or has (recently) occurred, and if so, providing stronger weight to the selection parameter and increasing the likelihood that the theme will be obtained in block 410. In some examples, if the users provide consent to use of their user data, the selection parameter may be based on the theme date and user data, and may be determined based on whether the user data indicates that an event type has occurred that matches the event indicated by the theme date. For example, a theme date can specify a "graduation," and user data can indicate that a user is located at a university at a particular time of day and year corresponding to a graduation, causing the selection parameter to have a higher weight. In some additional examples, the theme date may indicate dates or events during which videos with the theme may not be generated or when the probability of a theme being obtained is low. For example, a travel-related theme of "my recent travels" (e.g., to generate a video showing images depicting locations on recent travels of the user) may have a theme date that is associated with an event of the user returning to a home location. This theme date can cause the video to be generated when the user returns home. Thus, the theme of "my recent travels" may not be obtained in block 410 (or may have a low probability of being obtained) if the user data indicates that the user has not yet returned to a home location. Similarly, a theme location may indicate a type of event that takes place at that location, e.g., a sports stadium, picnic area, etc. and can influence the weight of a selection parameter for the theme based on the current user device location in comparison to the theme location.

In some implementations, one or more themes may be obtained in block 410 based on additional or alternative factors. For example, if the user consents to use of user information, such as demographic information, themes may be obtained based on user information. For example, if the user information indicates that the user is an avid trekker or mountain biker, and further, if image database 240 indicates that the user is associated with a number of images that depict the outdoors, one or more themes that related to outdoor activities may be obtained, e.g., themes such as "weekend treks," "summer in the mountains," "mountain biking holiday," etc. In another example, if the user information indicates that a user's wedding anniversary is coming up, themes that relate to the user's spouse, the wedding, or a previous anniversary, e.g., themes such as "Relationship movie," "Our 10$^{th}$ years together," etc. can be obtained. In some implementations, e.g., where user information is not available, themes may be obtained based on a variety of factors, such as popularity of a theme among multiple users (e.g., users of a network system, organization, etc.), theme date, theme location, whether the theme was recently created or updated, etc. In some implementations, themes may be obtained randomly, in chronological order of creation of the themes, in alphabetical order of theme titles, according to a predefined order based on a previous categorization of theme subjects (e.g., based on people, events, dates, etc.), etc.

In some implementations, one or more themes may be obtained in block 410 based on the images available to be included in the video to be generated. For example, themes for which there are not a threshold number of images that match the theme's image criteria (e.g., based on image content features, timestamps, location of capture, etc.), are not selected. The method may proceed to block 412.

In block 412, image criteria for an obtained theme can be determined. For example, image criteria 214 may be retrieved from themes database 210. Image criteria 214 may be specifically associated with the obtained theme, as described above. For example, image criteria for an obtained theme of "graduation ceremonies" can be particular and specialized to that theme, while image criteria for an obtained theme of "winter fun" can be particular and specialized to that theme, e.g., different than the image criteria for the theme of "graduation ceremonies." In some implementations, additional image criteria can also be obtained, e.g., stored user preferences or settings associated with the user that indicate particular preferences of the user for creating videos.

In some implementations, one or more of the image criteria can be determined based on user input. Some examples of implementations including such features are described with respect to FIG. 5.

In block 414, a plurality of images can be obtained, e.g., from image database 240. For example, the images may be retrieved, received, etc. and their image characteristics examined by the system. For example, a plurality of images associated with a user for whom the theme-based video is to be generated may be obtained. In some examples, recent images for the user (e.g., captured by the user within the last month, shared with the user within the last month, recent hundred images, etc.) may be obtained. In some examples, a larger number of images, e.g., all images, from the user's library may be obtained. In some examples, images may be obtained from image database 240 based on one or more image criteria associated with the obtained theme, e.g., one or more of image criteria 214. For example, for a theme that is a longitudinal retrospective, associated image criteria may specify timestamp-based criteria. In some examples, the criteria can include that images be associated with timestamps where the time difference between a first timestamp associated with a first image (e.g., an image associated with an earliest timestamp), and a second timestamp associated with a second image (e.g., an image associated with a latest or most recent timestamp) meet a threshold time difference, e.g., at least 10 years. In another example, the first and second timestamps can be positioned at other places within the range of timestamps for the plurality of images. In some cases, such criteria may cause most or all of the images associated with the user in image database 240 to be obtained. The method may proceed to block 416.

In block 416, a subset of images that meet image criteria 214 may be determined. For example, if an obtained theme is "Relationship movie," images that depict the user and a spouse may be identified. In another example, if an obtained theme is "mountain biking holiday," image criteria may specify that each image in the subset include a mountain bike, and that at least one image in the subset depict a biking trail. Criteria can also include time and/or geographic location of image capture, etc. The method may proceed to block 418.

In block 418, it is determined if one or more additional themes are to be obtained. For example, more themes may be obtained if the subset of images that meet the image criteria does not include enough images, e.g., a count of images in the subset of images does not meet a threshold, to produce a theme-based video for the previously-obtained theme(s). In some implementations, a theme author may be provided feedback, e.g., that image criteria for a theme are not met by a determined subset of images. A theme author may update the theme, e.g., image criteria 214, such that a likelihood of theme being selected to generate a theme-based video is improved.

In another example, it may be determined that one or more images in the subset of images do not meet criteria specifying particular image characteristics, e.g., visual quality characteristics related to the visual appearance of the images, particular image content criteria (e.g., if some types of image content features are designated to not be used in videos), or other characteristics. For example, the criteria can be specified in theme definition 211. In some examples, more themes may be obtained, e.g., to conduct evaluation of suitability of the themes for the user's library of images. In different implementations, a combination of these criteria and/or other criteria may be used to determine that more themes are to be obtained.

If it is determined that more themes are to be obtained, the method proceeds to block 410 to obtain another theme and determine image criteria, retrieve images, etc. as described herein. If it is determined that more themes are not to be obtained, the method proceeds to block 420.

In block 420, a particular theme of the obtained themes is selected to generate a theme-based video. For example, a confidence score may be calculated for each theme based on the subset of images and the theme definition, as explained earlier with reference to FIG. 3. The particular theme may be selected based on a confidence score, e.g., a theme that has a strong (e.g., high) confidence score. In some examples, ranking may be performed for the plurality of themes that are obtained. For example, ranking may include assigning a rank to each of the plurality of themes based on one or more of a respective engagement metric for a theme, a respective diversity metric for a theme, and historical data for a theme.

By using the different metrics individually or in combination as described herein, the method may cause different themes to be utilized to generate theme-based videos. For example, using the engagement metric to select a theme may provide themes that users find useful and interesting, e.g., associated with a relatively high engagement metric, are more likely to be used to generate videos, which can lead to greater engagement for theme-based videos. In another example, using the diversity metric to select a theme can reduce a tendency of popular themes (e.g., themes with high engagement metrics) to dominate or crowd out other themes (e.g., newer themes, seasonal themes, etc.), and allows videos to be made using such themes.

Use of historical data may allow the system to suggest or promote certain themes at a time when the theme may be suitable or particularly likely to provide a video that a user may enjoy. Using these factors in combination can cause overall engagement of users with theme-based videos, and can simultaneously permit use of new or less used themes, to determine if such themes are engaging to users. In this manner, the theme-based videos generated using techniques described herein can achieve variety in themes, promote new themes, and retain user interest, by ensuring that themes with high engagement are used to generate videos.

In block 422, a theme-based video may be generated based on the subset of images and the particular theme. For example, the theme-based video may be generated using the method described above with reference to FIG. 3. In some implementations where theme selection of FIG. 4 is implemented, certain blocks of FIG. 3 may not be implemented, e.g., video generation may begin directly at block 320.

In some implementations, multiple themes can be selected in block 420 and a theme-based video can be generated in block 422 based on subsets of images associated with each of the multiple themes.

Figure 5:
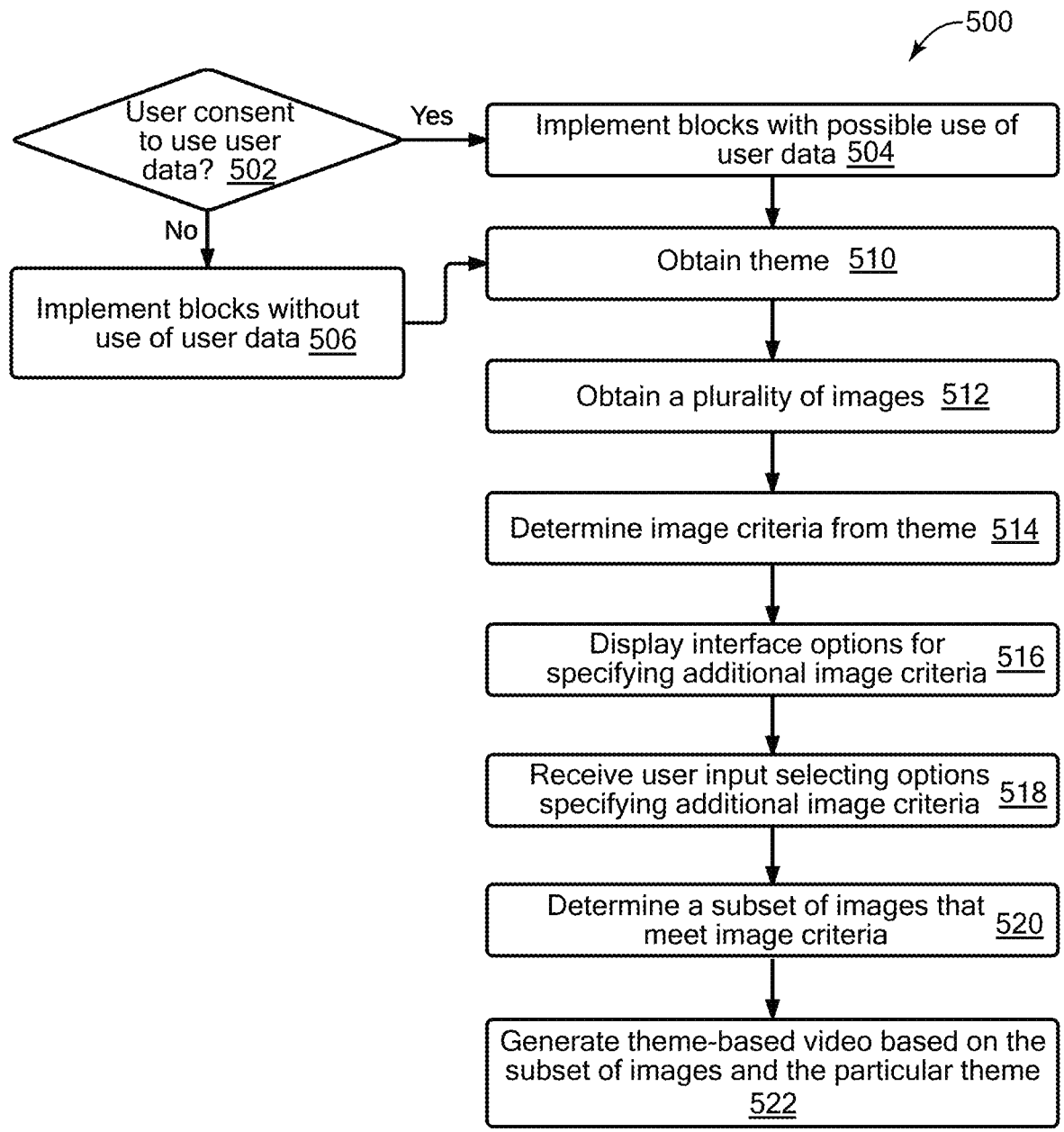
FIG. 5 is a flow diagram illustrating an example method to select a theme and image criteria to generate a theme-based video, according to some implementations.

FIG. 5 is a flow diagram illustrating an example method to select a theme to generate a theme-based video and generate the video, according to some implementations. In some implementations, method 500 can be implemented, for example, on a server system 102 as shown in FIG. 1, or by a system 200 as shown in FIG. 2. In some implementations, some or all of the method 500 can be implemented on a system such as one or more client devices 120, 122, 124, or 126 as shown in FIG. 1, and/or on both a server system and one or more client systems. In described examples, the implementing system includes one or more hardware processors or processing circuitry, and one or more storage devices such as a database 106 or other accessible storage. In some implementations, different components of one or more servers and/or clients can perform different blocks or other parts of the method 500.

In block 502, it is checked whether user consent (e.g., user permission) has been obtained to use user data in the implementation of method 500. For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated and/or accessed by a user, videos viewed or shared by a user, etc. One or more blocks of the methods described herein may use such user data in some implementations. If user consent has been obtained from the relevant users for which user data may be used in the method 500, then in block 504, it is determined that the blocks of the methods herein can be implemented with possible use of user data as described for those blocks, and the method continues to block 510. If user consent has not been obtained, it is determined in block 506 that blocks are to be implemented without use of user data, and the method continues to block 510. In some implementations, if user consent has not been obtained, blocks are to be implemented without use of user data and with generic or publicly-usable data.

In block 510, one or more themes can be obtained, e.g., theme data for a theme can be retrieved or received from themes database 210 of system 200. In some implementations, themes database 210 may be queried to determine available themes. Further, in some implementations, one or more of engagement metrics, diversity metrics, selection metrics or parameters, user information, popularity of a theme among multiple users, theme date, theme location, recency of theme creation or update, random determination, chronological order of theme creation, alphabetical order of theme titles, a predefined order, and/or one or more other factors can influence a particular theme to be obtained, e.g., similarly as described for block 410 of FIG. 4.

In some implementations, block 510 is performed in response to the system automatically determining that one or more themes are to be created and/or one or more videos are to be automatically generated, e.g., based on predetermined parameters and/or conditions that have been satisfied as described above with reference to FIG. 4 (e.g., the current day is within a theme date range associated with the theme, as described above, etc.). In some implementations, block 510 is performed in response to user input received by a user device, e.g., selection by the user of a displayed control to cause a video to be generated.

In some implementations, user input from a user may select a particular theme as an obtained theme, e.g., from a displayed menu of multiple theme titles (or other theme items such as icons, etc.) that identify different themes. For example, the menu can be displayed in response to user input commanding to generate a video, or in response to the system determining that a video can be generated based on particular conditions (e.g., current date, current user device location, etc.). In some examples, the displayed menu of theme items can be determined automatically from available themes based on theme selection criteria, similarly as described above for block 410 of FIG. 4. For example, a particular number of themes determined to have the highest selection metric or selection parameter (e.g., a subset of the available themes) can be displayed as theme items in the menu, e.g., in an order based on their currently-determined selection metrics or parameters.

In some implementations, the system examines the available images based on image criteria of the available themes and displays a menu of selectable themes based on the available images. For example, one or more of the themes in the menu can be selected by user input to become the obtained theme(s). For example, particular themes of the available themes which have sufficient available images to enable generation of a video are displayed in the menu (or are displayed more prominently or with higher rank in the menu, e.g., at the top of a displayed list of themes). Themes for which there are not sufficient qualifying images available to generate a video are not displayed in the menu (or are displayed with less prominence or rank, e.g., lower on a list in the menu). Furthermore, additional available themes can be displayed if requested by user input.

In some implementations, the system has a semantic understanding of theme items such as titles or other descriptors and can automatically generate one or more image criteria (e.g., one or more of image criteria 214) for a theme definition based on the theme item. For example, the system can maintain a set of stored associations of particular words, phrases, or semantic concepts that occur in theme titles with particular image criteria that have the user's consent to be used. In some examples, a term "grow up" appearing in a theme title can be associated with image criteria that search for images that depict children at different ages, if user consent has been obtained. In further examples, a term "winter" can be associated with image criteria that search for images that depict snow or other winter objects depicted in images, and/or search for images captured during a month occurring in winter. A term "vacation" can be associated with images captured at locations away from home (e.g., by examining, with user consent, location metadata associated with images to determine the location of capture of the images and comparing to known "home" location(s) of the user), etc.

In some implementations, machine learning models or other mapping models can be used in an inference stage to determine image criteria for a theme title, e.g., where the models have been trained using training data that indicates relevant image characteristics for particular words or semantic concepts appearing in theme titles. Some machine learning examples are described below with respect to FIG. 7. In some implementations, the system can generate such image criteria as suggestions that are displayed on a user device to the user, who may confirm or select particular image criteria from the suggested image criteria to use for generating the video.

In some implementations, a theme title or other theme characteristic is or has been input by a user, e.g., the user creates a theme and a user-created theme is obtained in block 510. In some of these implementations, the system can automatically generate one or more image criteria for a theme definition associated with that user-input theme title, e.g., based on the words and/or semantic concepts in the user-input theme title as described above. The method may proceed to block 512.

In block 512, a plurality of images are obtained, e.g., from image database 240. For example, the images may be accessed, e.g., retrieved or received, and examined by the system. For example, a plurality of images associated with a user for whom the theme-based video is to be generated may be obtained. In some examples, recent images for the user (e.g., captured by the user within a particular time period such as the last week or month, shared with the user within the time period, the most recent hundred images captured, etc.) may be obtained. In some examples, a larger number of images, e.g., all images, from the user's library, may be obtained.

In some implementations, images may be obtained from image database 240 based on one or more image criteria associated with the obtained theme, e.g., one or more of image criteria 214. For example, image criteria 214 that are associated with the obtained theme 510, e.g., and are stored in the themes database 210, can be used to obtain images. In an example, for a theme that is a longitudinal retrospective, image criteria may specify timestamp-based criteria. In some examples, the criteria can include that images be associated with timestamps where the time difference between a first timestamp associated with a first image (e.g., an image associated with an earliest timestamp), and a second timestamp associated with a second image (e.g., an image associated with a latest or most recent timestamp) meet a threshold time difference, e.g., at least 10 years. In another example, the first and second timestamps can be positioned at other places within the range of timestamps for the plurality of images. In some cases, such criteria may cause most or all of the images associated with the user in image database 240 to be obtained. The method may proceed to block 514.

In block 514, image criteria for an obtained theme are determined, e.g., additional stored image criteria 214 that have not already been obtained to obtain the images in block 512 as described above. For example, image criteria 214 may be obtained from themes database 210. Image criteria 214 may be specifically associated with the obtained theme, as described above. In some implementations, additional image criteria can also be obtained, e.g., stored user preferences or settings associated with the user that indicate particular preferences of the user for creating videos. In some implementations, block 514 can be performed prior to block 512 and the plurality of images obtained in block 512 can be obtained using one or more of the determined image criteria, as described above.

In block 516, in some implementations, one or more interface options (e.g., interface elements) can be displayed for specifying additional image criteria (or for specifying all image criteria to be used in generating the video, in some implementations). The displayed options allow one or more image criteria to be specified and determined based on user input from a user. For example, user input can select one or more of the displayed options that specify image criteria or influence image criteria. In some examples, a user interface is displayed by a user device, which includes a display of one or more interface elements receptive to user input selecting or providing input to the interface elements, and which specify one or more image criteria. The interface elements can include menus, selection boxes, buttons, sliders, or other controls. The user input can be received as text in a text field, selections of displayed images, or other types of input. In various implementations, the user interface can be displayed at the time or close in time to the generation of the video, or can be displayed in advance of video generation, e.g., to specify user preferences or settings that are stored in accessible data storage and retrieved at the time of video generation and performance of block 514.

In some example implementations, an application or other software running on a user device can examine or scan a set of available images to determine a set of candidate images that are presented to the user in the user interface as candidate criteria that can be selected to specify image criteria for a generated video. For example, the set of candidate images can be displayed in a candidate list in the user interface. In some examples, the examined set of available images can be the plurality of images retrieved in block 512. In some implementations, the examined set of available images can be a first subset of the plurality of images retrieved in block 512, where the first subset is determined based on the obtained theme and/or by any obtained image criteria 214 that has been previously associated with the obtained theme (e.g., image criteria obtained in blocks 510 and/or 512). For example, one or more of the image criteria 214 can indicate that particular types of image content and/or other image characteristics are associated with the obtained theme, and the set of candidate images can satisfy those image criteria 214.

In some examples, this can allow the user to specify more narrow or additional image criteria using candidate images that have been selected based on stored image criteria. For example, if the obtained theme 210 is a theme broadly related to vacations or travel, the image criteria 214 may specify to retrieve images having metadata and/or image content features related to vacations, such as geographic location of capture outside particular areas (e.g., home city of user), time of capture during a known user-calendar vacation event, and/or depicting image content features including people holding luggage, airplanes, scenic vistas, etc. A set of candidate images based on such image criteria can be selected and displayed in the user interface in block 516, allowing the user to select from these candidate images (as in block 518, described below). In some implementations, some of image criteria 214 can be specifically designated to be used to generate candidate images for block 518 and not used to select images for the generated movie, and other image criteria can be specifically designated to be used to select images to be included in the generated video (as in blocks 520 and 522, described below) and not used to determine candidate images for block 518.

In some examples, if user consent has been obtained to use image content detection or recognition techniques, faces can be detected in the set of images. The set of candidate images can depict the detected faces and can be displayed in a candidate list in the user interface. In some implementations, the system may detect multiple images of the set of images that depict faces of the same person (without determining identities of the persons), and can select to display a single candidate image of those multiple images in the user interface, e.g., as a representative image for that person. Thus, a single image of each different detected person can be presented as a candidate image in the user interface. In some implementations, if the utilized face detection or recognition techniques do not determine whether a face in a first image is the same person as a different face in a second image (e.g., above a predetermined confidence score or level), then both of these images can be presented as candidate images in the user interface. For example, a prompt can be displayed in the user interface that indicates that it was ambiguous to the system whether these two images depict the same person, and that requests user input to indicate whether or not they are the same person (and/or user input can be received that selects one or both images to use as image criteria in block 518).

In further examples, other particular types of image content features can be detected in the set of images and the images that depict those types of content features can be displayed as candidate images. For example, types of image content features can include monuments (e.g., Eiffel Tower, etc.), animals of particular types (cats, dogs, birds, etc.), objects of particular types (e.g., vehicles, devices, furniture, food, etc.), landscapes (e.g., mountains, lakes, trees, buildings, sunsets, etc.). The system can present candidate images in the user interface that depict particular types of image features as indicated in user preferences, in current user input (e.g., in response to displaying a request for such user input), and/or as various distinct types of image features detected by the system in the set of images. Similarly as described above, a single candidate image can be displayed in the user interface for each image feature or type of image feature detected in the images, such that duplication of the same image features and/or same types of image features are avoided being displayed in the user interface (e.g., unless image feature detection is under a threshold confidence level as described above).

In some implementations, the system does not display a candidate image as a selection option if the system has determined that there are not sufficient available images to generate a video using that image or using image content of that image, e.g., where the sufficient number can be specified in the theme definition or theme template. For example, if it is determined that there are not a sufficient number of available images to generate a video with a particular person detected in a particular image, that image and other images depicting that person are not displayed as candidate images. In some implementations, the system displays candidate images without such determination, and determines if there are sufficient images available for a video in response to the user selecting a particular candidate image (and outputs a notification on a user device that there are not sufficient images if that is the case).

Other interface options can also be displayed to allow specification of image criteria by user input. Some of the options can allow the user to specify image criteria similar to the image criteria 214 of the theme database. For example, the options can indicate particular time periods for image capture times, geographic locations for image capture locations, particular activities or events that are depicted in images (e.g., birthdays, parties, social events, sports games, athletic activities, and so on), etc.

In block 518, user input is received that selects one or more of the displayed interface options to specify additional image criteria for selecting images for a generated video. For example, user input can select one or more interface elements. In some examples, user input can be received to scroll through the candidate list showing the set of candidate images to display any of the candidate images, and the user can select one or more of the candidate images to indicate that the content features (e.g., persons or other features) depicted in the indicated images are to be the subjects of the generated video. The user indicates image criteria, e.g., particular image features, via the selections. The user input can also select other types of displayed options to specify other image criteria such as time periods, geographic locations, etc.

In some implementations, the system can present displayed options that assist or guide the user to make one or more selections of themes and/or image criteria. In some examples, further selection options can be displayed after user input specifies particular image criteria, e.g., to guide the user to obtain greater specificity in user-specified image criteria. For example, first user input can specify particular image criteria, and then additional interface selection options can be displayed in a second presentation which can further specify the image criteria based on user selections. In some examples, first user input can select a time period of image capture, and candidate images in the set of images that were captured in this time period are displayed. User input then selects particular images which exhibit particular image criteria for inclusion in the generated video, such as particular people, particular types of content features, etc. In some implementations, additional image characteristics of the selected images can be displayed in a third presentation, and the user input may specify or clarify which of the additional characteristics are to be image criteria. For example, if user input has selected a candidate image that depicts a vehicle, person 1, person 2, and a sunset, then the system can display each these content features as an image criteria option to allow the user to indicate which of these content features are intended as image criteria for the video to be generated.

In some additional examples of selection options that guide the user, multiple available themes can be displayed for user selection in a first menu. Based on a particular theme selected from the first menu by user input, multiple selectable soundtracks are displayed in a second menu (e.g., similar to soundtracks described with reference to block 320 of FIG. 3). For example, the displayed soundtracks can be available soundtracks which are determined to have stored, predefined associations with the selected theme, and/or which are associated with higher scores, e.g., confidence scores as described herein. Based on the selected theme and a particular soundtrack selected from the second menu by user input, candidate images can be displayed in a third menu as described above. The user can then be presented with a sequence of images that will be included in the video, and user input can modify the images and/or characteristics of the video.

Some examples of user-specified image criteria are described below with reference to FIGS. 6A-6G.

In block 520, a subset of images that meet the image criteria obtained in blocks 514 and/or blocks 514-516 may be determined. For example, if an obtained theme is "Relationship movie," the image criteria may be specified image features such as particular persons, and images that depict the specified persons may be identified in the plurality of images. In another example, if an obtained theme is "mountain biking holiday," image criteria may specify that each image in the subset include a mountain bike, and that at least one image in the subset depict a biking trail. Criteria can also include time and/or geographic location of image capture, etc. In some cases or examples, more specific image criteria was specified in block 518, which causes a smaller set of images to be provided in the subset compared to images obtained by using broader associated image criteria 214. In some implementations, additional themes may be obtained and image criteria determined, and a subset of images may be determined for the additional themes, similarly as described above in block 418 of FIG. 4. The method may proceed to block 518.

In block 522, a particular theme (such as the obtained theme of block 510) and its associated subset of images are used to generate a theme-based video. For example, the theme-based video may be generated using the method described above with reference to FIG. 3. In some implementations, e.g., if multiple themes have been obtained and subsets of images determined, a confidence score may be calculated for each obtained theme based on the subset of images and the theme definition, and the particular theme used for the generated video may be selected based on a confidence score, as explained with reference to FIGS. 3 and 4.

Additional blocks similar to FIG. 3 can be implemented for FIG. 5, e.g., determining if the count of images in the subset of images satisfies a threshold as in block 314, checking a confident threshold as in block 318, determining a soundtrack as in block 320, receiving feedback as in block 326, and calculating an engagement metric as in block 328. In various implementations, certain blocks of FIG. 3 may not be implemented.

In some implementations, multiple themes can be selected in block 510 and a theme-based video can be generated in block 522 based on a combination of subsets of images associated with each of the multiple themes.

In any of the implementations described herein, the particular images can be displayed that meet the theme's image criteria and are to be included in the video to be generated, and a particular order or sequence of presentation of the images in the video can also be indicated (e.g., displaying rows and/or columns of images in an order of appearance in the video, etc.). A user interface can allow user input to modify the included images and/or characteristics of the video. For example, user input can modify which images are to be included in the video, modify the order of presentation of the images in the video, specify or modify transitions in display of sequential images in the video (e.g., fade out the display of one image while fading in display of the next image, or slide one image out the left edge of the screen and the next image in from the right of the screen, etc.), specify a type of presentation in the video (e.g., a collage in which multiple images displayed simultaneously or a presentation of sequential single images), etc.

In any of the implementations described herein, a theme may be obtained based on a soundtrack that is selected. In some examples, the soundtrack is selected by the user, e.g., from a displayed menu or list of available soundtracks (e.g., music tracks or files from the user's stored collection). In some examples, the soundtrack is selected automatically by the system based on one or more particular conditions being met. For example, such a condition can be that a particular audio segment (e.g., song, audio track, etc.) was played on a user device by the user (as detected by the system if user consent has been obtained to do so) within a particular time period prior to the current time. In another example, a condition can be that a particular audio segment is present on a user's listening list or favorites list, and/or is frequently played by the user (e.g., above a threshold number of times).

Based on the selected soundtrack, a theme can be automatically selected that is appropriate for the soundtrack. For example, the theme can be selected based on stored associations between theme characteristics and soundtrack characteristics, similarly as described above. In some implementations, after the theme is selected based on the selected soundtrack, image criteria for the video may be automatically determined and/or suggested to the user based both on the selected theme and the selected soundtrack. For example, image criteria can be determined based on stored associations between image criteria and soundtrack characteristics and/or theme characteristics. In an example, image criteria that searches for a person's smiling face depicted in images (with user consent) can be associated with a soundtrack having characteristics including an upbeat tempo, and also can be associated with themes that include associated descriptive words in the title (e.g., a person's name, "friend", "family", etc.).

In some implementations, one or more images to include in the video are determined and/or suggested to the user (e.g., displayed on the user device) based both on the selected theme and the selected soundtrack. For example, such images can be automatically selected for the video based on stored associations or mappings between image characteristics and theme/soundtrack characteristics. In some examples, image characteristics such as image content features of a particular type (e.g., smiling faces) and a particular capture time (e.g., during a summer season) can be associated with soundtrack characteristics (e.g., label of "happy" in soundtrack metadata, or a category of "happy" with which the soundtrack is associated) and theme characteristics (e.g., a particular theme date, particular words in a theme title, etc.).

In any of the implementations described herein (e.g., methods of FIGS. 3, 4, and/or 5), images associated with multiple users (e.g., uploaded by the users to a server) can be stored in shared albums or other shared collections. Multiple users and devices share these images and each have access to the images shared in these collections, e.g., over the network. In some implementations using such shared albums, the system can examine the shared images stored in such shared albums as the available total set of images to be used for generating the video. The generated video can be provided for all (or a subset) of the users of the shared album, for example. In some implementations in which themes or image criteria are generated and/or displayed for selection by the system based on available images, the system can determine shared themes and/or shared image criteria based on shared collections of images. In some implementations, the system can determine which image characteristics (e.g., image content features if user consent has been obtained, time ranges of image capture, etc.) are common in images contributed from different users to a shared album, and use the set of shared images that depict these common features as the set of available images from which the video is generated. For example, the shared images in a shared album which are determined to have been captured on a particular day (e.g., that the sharing users were both physically present at an event such as a picnic) and captured at a particular location (as indicated in image metadata), can be used as the set of available images to use in generating the video.

In some implementations, other types of user content (e.g., content items) can be selected from stored content data associated with the user and provided in a generated video, similarly to images provided in a video as described herein. For example, stored content items can include other types of images such as videos as described above, such that the generated video includes one or more videos. Stored content items can include other types of images such as cinemagraphs (e.g., animated GIFs) which can be, for example, images including one or more animated portions on a static background. In some implementations, user input can be received from a user to select a video from which cinemagraphs can be extracted (e.g., the system can automatically detect active or animated portions of the video which can be converted into cinemagraphs by stabilizing the background, etc.). In some implementations, user input can select particular portions or segments of a video to convert into cinemagraphs for inclusion in the generated video.

Stored content items can include segments of audio data, e.g., audio data that is output from speakers of a playing device. Such audio data can be distinct from the soundtrack selected to accompany a generated video described above, e.g., a soundtrack can be interrupted and silenced while an audio content item is played at a particular time point in an output generated video.

In some implementations, other types of collective content item presentations (e.g., media presentations) can be generated in methods similar to the methods described herein, instead of or in addition to videos. For example, a collage of images or videos can be generated, where the collage includes the determined subset of images or videos associated with the user as described above. When displayed, the collage of images and videos includes a particular spatial arrangement of the images and videos, e.g., images displayed in a particular pattern (e.g., random or user-specified), with the borders of the images being adjacent to borders of other images, and/or having space or other content provided between images in the collage. In some implementations, the collage can be a video, e.g., that displays different sets of images or videos over its duration.

In another example, a content item presentation that is a collection of images can be generated to be displayed similarly to a book or document, e.g., a document having pages, windows, or views which can be displayed, and having different arrangements of a portion of the selected subset of images displayed on each page. In some implementations, such a collection of images can be printed as a physical book of photographs using an accessible photo-printing device or service. In one example of such a displayed presentation, a left page, window, or view of the presentation can display a first image of a subject (e.g., a person), and a right page or view of the presentation can display a second image of that same subject, depicting different visual conditions. For example, images of a particular person at different ages, at different locations, or in different moods (and/or also having some similarities in environment, background area or objects, etc.) can be displayed in corresponding locations on the different pages, to show a contrast between these images.

In some implementations, graphical features can be added to one or more content items based on a selected theme, e.g., to create a video or other type of media presentation. For example, a theme-based image or video can include a displayed frame or border surrounding the image or frames of the video that includes visual features related to the theme. In some examples, a video having a winter holiday theme can include snowflakes, presents, holiday colors, and/or other images or decorations in a border around the video frames, where such features are stored as associated with the particular theme. in various implementations, such graphical features can be presented in a menu for user selection, and/or can be associated with themes and/or image criteria similarly to soundtracks as described herein.

In some implementations, a machine-learning application is used to automatically determine image content, image content type and/or image criteria from data stored in the database, e.g., the image database. The data processed, in particular as training data, by the machine-learning application, includes image data, communication data, in particular e-mail and/or chat data, documents, map data, geographical location data, game data, metadata, synthetic data generated for the purpose of the training, and/or personal profile data. In some implementations, the machine-learning application includes a trained model, in particular a neural network, and/or an inference engine. In some implementations, one or more tags descriptive of the image are automatically assigned to an image, in particular through a machine learning application, and the tag(s) are used in the query of the database, e.g., the image database.

The methods, blocks, and operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

FIGS. 6A-6G are graphical illustrations of example graphical user interfaces which can be used in a process of automatic generation of videos, including features as described herein. Images depicted in these examples can be digital photographs originally captured by a camera or similar types of images, for example. In some implementations, the interfaces and images shown in FIGS. 6A-6G can be displayed by a display device (e.g., display screen) of a user device such as a client device 120, 122, 124, and/or 126 of FIG. 1, or a server system 102 in some implementations. In some examples, the user device can be a mobile device (cell phone, smartphone, tablet device, wearable device, etc.), laptop computer, etc., or can be a larger device, e.g., desktop computer, etc.

Figure 6B:
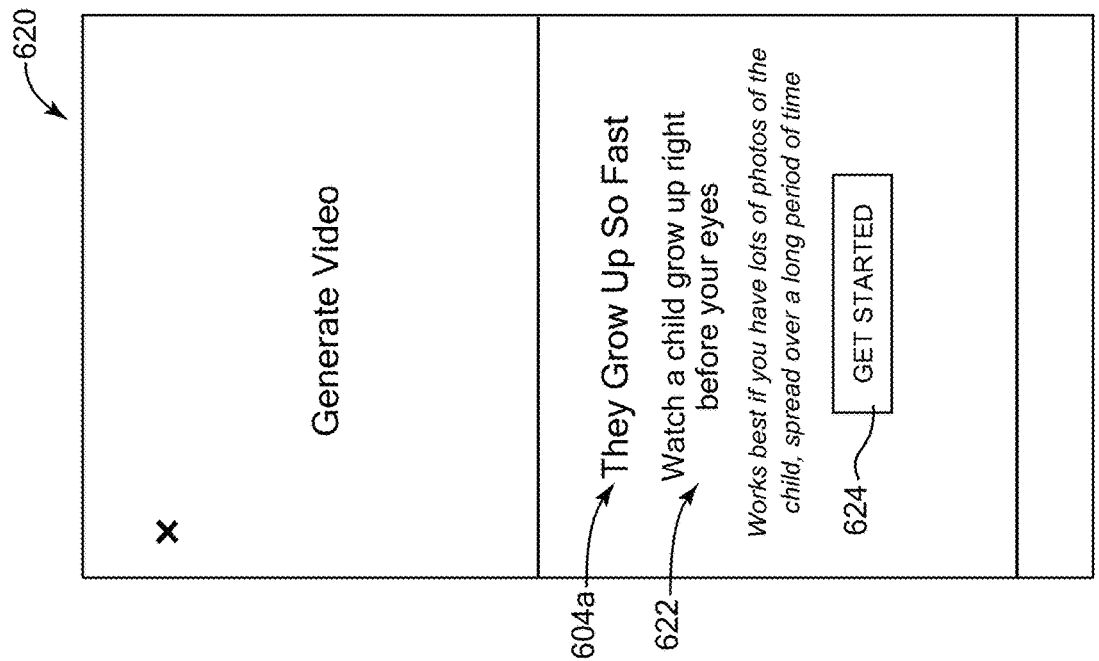
FIGS. 6A-6G are diagrammatic illustrations of example graphical interfaces providing one or more features in the generation of videos.
Figure 6A:
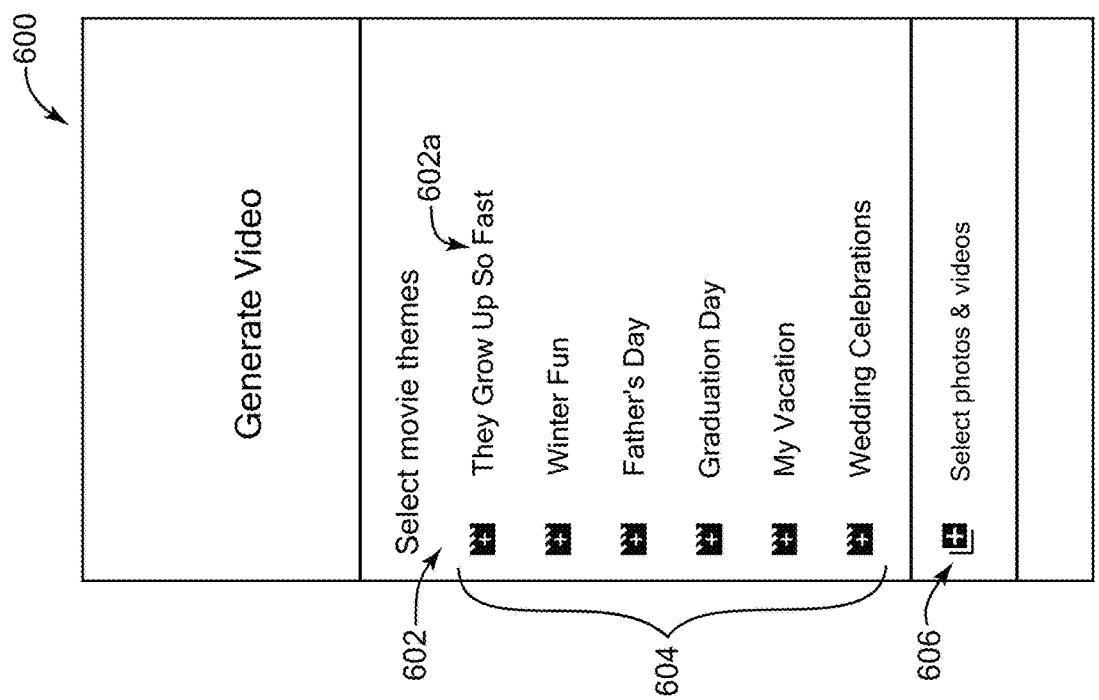

FIG. 6A shows an example of a user interface 600 which can be used by a user to select images and/or themes to be used in automatically generating videos including images associated with the user. In this example, the user device displays interface 600 in response to determining that a user has commanded the system to generate a video from user-associated content items such as images. For example, user input may have been received in a different interface to cause the user interface 600 to be displayed (e.g., selecting a "create video" button or providing another command).

In this example, a menu 602 of predefined theme items 604 is displayed in the interface 600, where each theme item 604 identifies a particular theme. Any of the theme items 604 can be selected via user input to command initiation of a process to generate a video that includes images related to the theme of the selected theme item. In some implementations, one or more of the theme items 604 can be predefined, e.g., by the user and/or a service provider or other party. In some implementations, one or more of the theme items 604 can be determined based on theme selection criteria being satisfied, e.g., a theme date of a theme being satisfied, a theme location being satisfied, or other criteria as described herein. In some implementations, the theme items 604 can represent the highest scoring themes based on selection criteria or selection parameters as described herein, and the theme items can be displayed in an order based on these scores, e.g., from highest to lowest scores.

In some implementations, a user can select a theme item 604 and/or provide a different input (e.g., select a particular interface element, select a different input device button, input a particular edit command, etc.) to edit the associated theme. For example, an editing interface can be displayed on the device in response to such an edit command. User input can then modify an existing theme definition, image criteria (e.g., image criteria 214 of FIG. 2), and/or other parameters of a theme. In some implementations, the interface 600 can also provide a displayed option to define and create a new theme via user input.

A selection option 606 is displayed in interface 600 to enable the user to manually select particular images and other content items to be included in a generated video, e.g., from the user's images and other content that can be browsed using interface 600 or other interface. For example, the video can be generated based on user-selected images without reference to a theme. In some implementations, the user can manually select images to supplement the subset of images that have been selected for the generated video based on one or more themes.

In other implementations, a theme may be automatically selected by the system, without user intervention, based on one or more theme selection criteria or other factors as described above.

In FIG. 6B, an example graphical interface 620 is displayed in response to receiving user input in interface 600 of FIG. 6A that selects the theme item 604*a* in menu 602. The theme item 604*a* is displayed in interface 620 and a description 622 of the theme is also displayed. In this example, the description includes a hint to the user as to which characteristics of the user's images may enable the video to be generated and/or provide a more compelling generated video. A selection button 624 is also displayed. A video generation process is initiated in response to the selection button 624 being selected by user input.

Figures 6C, 6D:
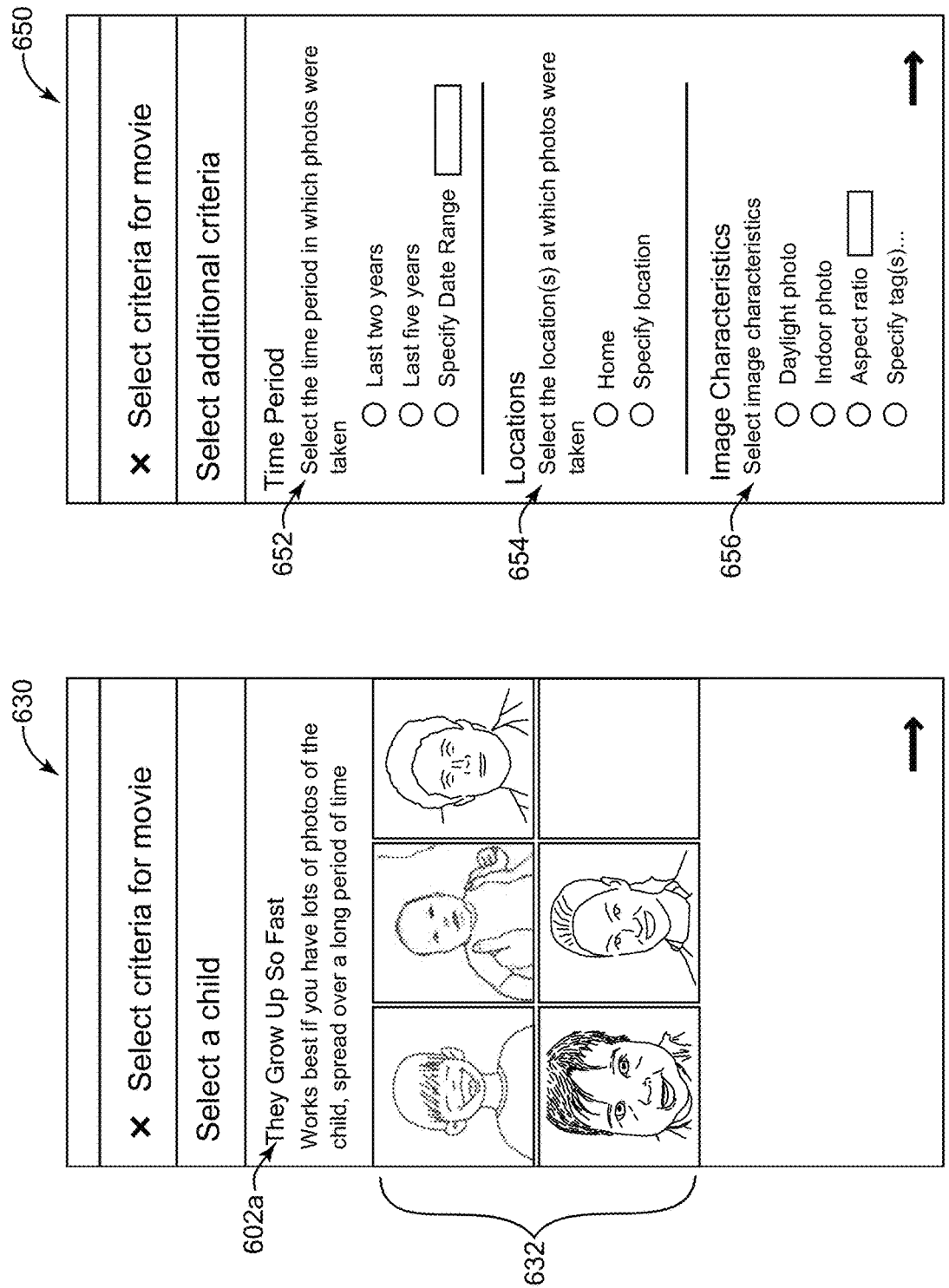

In FIG. 6C, an example graphical interface 630 is displayed in response to receiving user input in interface 620 of FIG. 6B that selects the selection button 624. In this example, a set of candidate images 632 have been selected from the user's available images (e.g., from the user's albums and other available image collections stored on one or more accessible servers and/or client devices). The selected theme item 604*a* is associated with predefined image criteria that are used to determine the set of candidate images 632. For example, the selected theme of "They Grow Up So Fast" is related to presenting a number of images in a video, where the associated image criteria (e.g., image criteria 214) includes rules for selecting a minimum number of images that depict a particular person (e.g., child) in images separated by a minimum time span between times of capture of those images over a total threshold span of time (e.g., several years), to include in a generated video. If user consent has been obtained, the system uses one or more of this existing image criteria to determine the candidate images from the user's images. In one example, the system uses a portion of the image criteria, e.g., the selection of children, to detect several different children depicted in the user's images, if user consent has been obtained to perform such detection. The system presents the candidate images 632 as representative images of the detected children, e.g., without checking whether the children satisfy other or remaining image criteria.

In another example, the system detects children in the user's images and also checks all or a larger number of the image criteria to determine which of the detected children are in images that satisfy the image criteria. For example, the system may detect seven children in the user's images, but determines that only three of the children are depicted in the minimum number of images over the threshold time period specified in the image criteria. The system then presents three representative candidate images that depict the three children that qualify under the image criteria.

In this example, user input from the user can select one of the candidate images to indicate which of the depicted children are to be the subject of the generated video. In some implementations, the user input can select multiple images, causing multiple children to be provided as subjects in the generated video of this example.

In FIG. 6D, an example graphical interface 650 is displayed that presents additional selection options that enable a user to specify image criteria for selecting images to be included in a generated video. In this example, interface 650 is displayed in response to receiving user input in interface 630 of FIG. 6C that selects one of the candidate images 632, and/or a selection of a interface element to advance in the video generation process. In some implementations, interface 650 is displayed instead of interface 630 of FIG. 6C.

Interface 650 displays several additional selection options for the user to specify image criteria. Example selection options include time period options 652, by which the user can specify a time period in which images were captured or created. Time period options 652 can include predetermined options, and/or options in which the user directly specifies a time period. In some implementations, one or more selection options are based on stored and predefined image criteria associated with the selected theme (e.g., image criteria 214). In one example, predefined image criteria may specify a minimum time period of two years over which the images are to be selected, and variations of this time period can be displayed as options (e.g., adding one or two years, subtracting one or two years, etc.).

Displayed example selection options also include location options 654, which allow the user to specify a particular location at which images were captured. For example, metadata of images indicating the geographic location of capture (e.g., geographic coordinates) can be used to determine if images qualify for image location criteria. Example locations can include the home of the user, which the system may determine (with user consent) based on a designated stored home location for the user, or infer (with user consent) based on a history of locations visited by the user. A user can specify one or more particular locations to act as image criteria, e.g., by inputting text names of locations (addresses, names of businesses, etc.), and/or by selecting locations on a map displayed by the device.

Displayed example selection options also include image characteristics 656, which may include a variety of different characteristics which the user can specify as image criteria. Example selectable characteristics include daylight or indoor characteristics, such that the system detects whether images were captured in daylight or indoors (e.g., based on brightness of photos, landscape or indoor backgrounds, etc.). Example selectable characteristics can include aspect ratio of the images. The user can specify particular tags which are associated with images as metadata, e.g., to identify content features depicted in the image using text. The user can specify that images having specified tags are to be selected for inclusion in the generated video. Other image characteristics can also be presented as selectable options in the interface 650.

Figure 6F:
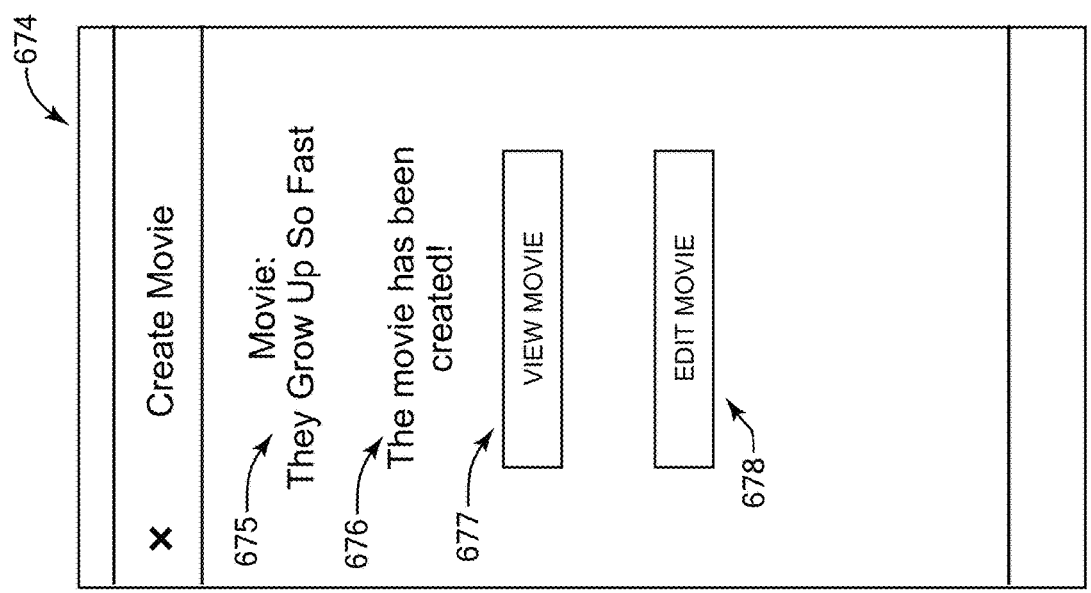
Figure 6E:
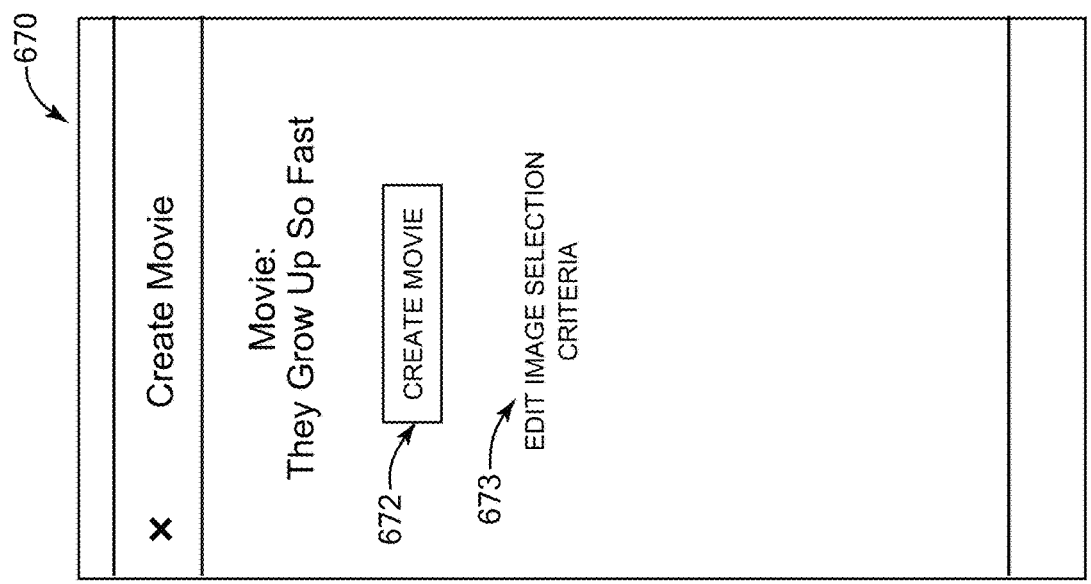

In FIG. 6E, an example graphical interface 670 is displayed in response to user input indicating that the user has completed specifying image criteria, e.g., in interface 620 and/or interface 650. A create button 672 is displayed in interface 670 that, when selected by user input, causes the system to generate a video based on the image criteria and based on the user's accessible images. An edit control 673 can also be displayed that, when selected by user input, causes an image criteria selection interface 630 or 650 to be displayed which shows the currently-selected options. This allows user input to edit previously-selected image criteria.

In some implementations, if one or more of the current user-selected image criteria and/or predefined image criteria are not satisfied by the available images, then a video will not be generated and a notification of this condition can be displayed in interface 670 instead of the create button 672. The user may select the edit control 673 to change image criteria until they are satisfied by the available images, select a different theme, etc. Alternatively, such a notification can be displayed in any of the interfaces 620, 650, 674, etc., e.g., in response to one or more satisfied image criteria becoming unsatisfied due to user selection of new image criteria or change of image criteria, or upon determination by the system of unsatisfied image criteria.

In some implementations, a graphical interface similar to interface 670 can be displayed in response to the system automatically obtaining one or more themes and/or automatically determining to generate a video without user intervention, as described herein, e.g., with reference to FIGS. 3 and 4. For example, if one or more conditions are satisfied to obtain a theme and/or generate a video, the create button 672 can be displayed so that the user can select or confirm to generate the video.

In FIG. 6F, an example graphical interface 674 is shown to provide information related to creation of a video. In some implementations, a notification 676 is displayed to indicate that an indicated video has been created by the system for the indicated theme 675. Notification 676 can be displayed by the system after the video has been generated, or during generation of the video.

A view button 677 can be displayed in the interface 674 such that, when the view button 677 is selected by user input, the generated video is displayed and played by the user device, e.g., in the interface 674 or in a different viewing interface that is displayed in place of interface 674 on the device. An edit video button 678, when selected by user input, triggers a video editing interface (not shown) to be displayed by the device, which allows user input to cause display of the video and edit various characteristics of the video, e.g., edit content of frames, remove or add frames, edit the accompanying soundtrack, etc.

Figure 6G:
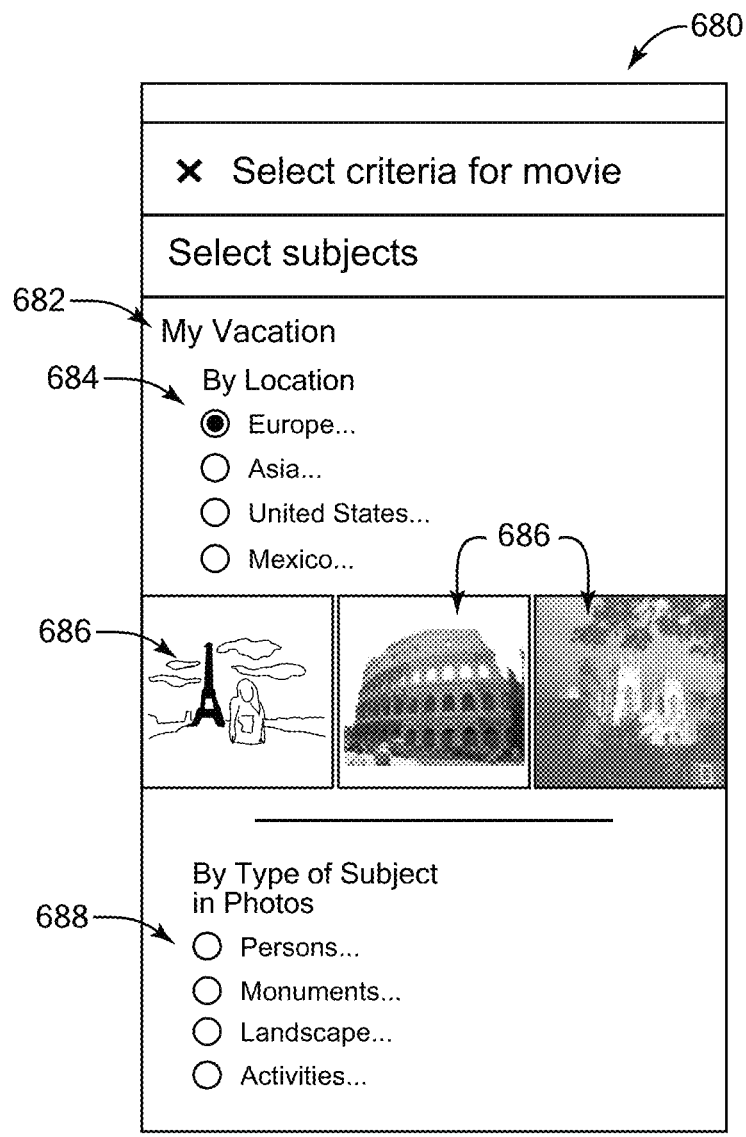

FIG. 6G illustrates an example graphical interface 680 that presents additional example selectable options for a user to specify image criteria. In this example, a theme has been selected which is related to a user's vacation, as indicated by the theme indicator 682. Associated image criteria for this theme are examined to determine and display location options 684 in the interface 680. Location options 684 present different geographical areas, e.g., cities, countries, continents, etc., from which the user can select to further specify the images to be selected for the video to be generated. In some implementations, a number of candidate images 686 are displayed in response to the selection of one or more of the location options 684. The candidate images can be representative images indicating a particular image characteristic, such as a location of image capture. For example, a selection of "Europe" from location options 684 causes the system to search the user's images for candidate images that were captured in Europe. Candidate images 686 result from the search. In this example, each candidate image was captured in a different country of Europe, because the user's images include images from these three countries. User input can select one or more of the candidate images 686 to specify image criteria, e.g., specify that the generated video will have images from the country in which the selected image was captured, specify the types of content (e.g., monuments, people, etc.). In some implementations, instead of or in addition to the candidate images 686, a list of countries can be displayed as text selection options that name the different detected locations in the user's images, allow the user to select one or more of the options to specify image criteria.

Interface 680 also displays an example set of additional subject selection options 688. Selection options 688 allow further specification of image criteria as selection of one or more subjects by user input, where the subjects are intended by the user to indicate the types of image content features that are to be included in the generated video. For example, the subject selection options 688 can include persons, monuments, landscape types, activities of different types, etc. In some examples, selection of one of the subject selection options 688 by user input can cause additional options to be displayed, allowing further specification of the selected image criteria. For example, selection of the landscape option can be followed by displaying more specific options for image criteria such as "mountains," "lakes," "trees," etc. Selection of the activities option can be followed by more specific options such as "sports," "parties," "picnics," "hiking," "bicycling," etc. When generating the video, the system can check the user's images for content features that indicate these types of activities, e.g., detecting sports uniforms and a sports equipment for detecting sports, detecting a group of people and drinks or food to detect parties and picnics, etc. In some implementations, candidate images that represent or demonstrate these options and content features can be displayed, similarly to the candidate images 686.

Additional options can be presented in similar interfaces for image criteria and other criteria. For example, selectable options for soundtrack types can be displayed. In some examples, selectable options for types of soundtracks can include "lively" or "upbeat", "soothing," "background," or particular music genres such as "classical," "jazz," "rock", etc.

Figure 7:
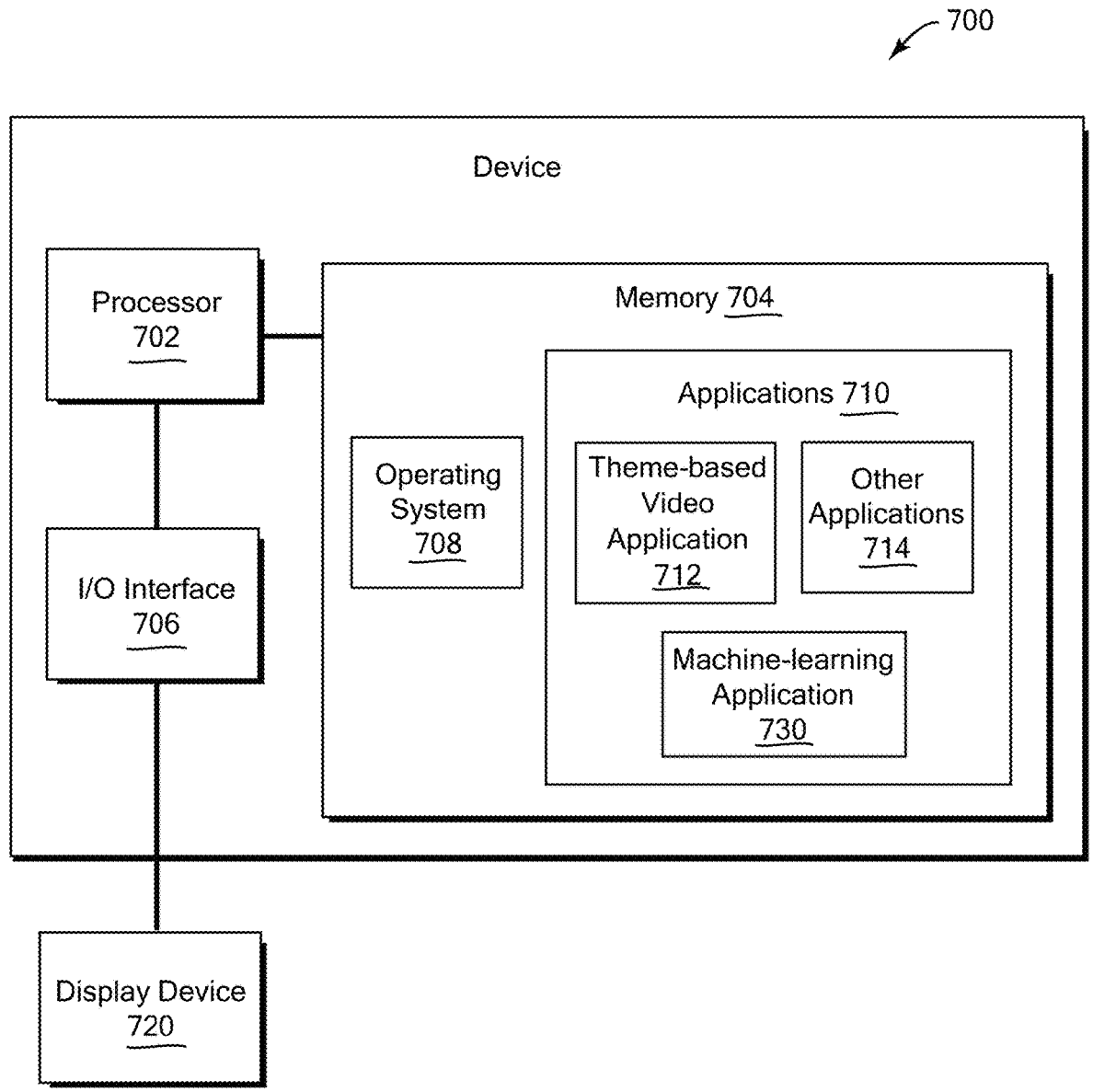
FIG. 7 is a block diagram of an example device which may be used for one or more implementations described herein.

FIG. 7 is a block diagram of an example device 700 which may be used to implement one or more features described herein. In one example, device 700 may be used to implement a client device, e.g., any of client devices 120-126 shown in FIG. 1. Alternatively, device 700 can implement a server device, e.g., server device 104 of FIG. 1. Device 700 can implement a system, e.g., example system 200 of FIG. 2. Device 700 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 700 includes a processor 702, a memory 704, and input/output (I/O) interface 706. Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708 and one or more applications 710 such as a data display engine, web hosting engine, image display engine, notification engine, social networking engine, etc. In some implementations, the applications 710 can include instructions that enable processor 702 to perform functions described herein, e.g., some or all of the methods of FIGS. 3 and 4. For example, applications 710 can include one or more theme-based video applications 712, including a program to receive, generate, and display theme-based videos, and store related data as described herein. In some implementations, these functions can be distributed among different applications (and/or devices). One or more of the applications can, for example, provide a displayed user interface responsive to user input to display selectable options or controls, and data based on selected options. Other applications or engines 714 can also or alternatively be included in applications 710, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

A machine-learning application 730 can be stored in memory 704 and/or in storage of other devices accessed by the device 700 and can be used in implementing various features, e.g., determining image content and image content types in images, providing suggested image criteria and themes, etc. (In other implementations, other techniques can be used for such features, e.g., detecting image features using comparisons to reference images, etc.) The machine-learning application 730 may utilize Bayesian classifiers, support vector machines, neural networks, or other learning techniques. In some implementations, machine-learning application 730 may include a trained model, an inference engine, and data. In some implementations, the data may include training data, e.g., data used to generate the trained model.

For example, the training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train the trained model, training data may include such user data. In implementations where users permit use of their respective user data, the data may include permitted data such as images (e.g., photos or other user-generated images), communications (e.g., e-mail; chat data such as text messages, voice, video, etc.), documents (e.g., spreadsheets, text documents, presentations, etc.). In some implementations, the data may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 1230 excludes the data.

The machine-learning application also includes a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence (e.g., in a chat message), frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of machine-learning application 730. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In some implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using the data, to produce a result. In various implementations, the trained model may be provided as a data file that includes a model structure or form, and associated weights. An inference engine may read the data file for trained model and implement a neural network with node connectivity, layers, and weights based on the model structure or form specified in the trained model.

Training of a machine-learning model may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input. In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

Machine-learning application 730 also may include an inference engine. The inference engine is configured to apply the trained model to data, such as application data, to provide an inference. In some implementations, inference engine may include software code to be executed by processor 702. In some implementations, the inference engine may specify circuit configuration (e.g., for a programmable processor, for a field programmable gate array (FPGA), etc.) enabling processor 702 to apply the trained model. In some implementations, the inference engine includes software instructions, hardware instructions, or a combination. In some implementations, the inference engine offers an application programming interface (API) that can be used by operating system 708 and/or applications 712 and/or 714 to invoke the inference engine, e.g., to apply a trained model to application data to generate an inference.

Machine-learning application 730 may provide several technical advantages. For example, when a trained model is generated based on unsupervised learning, the trained model can be applied by the inference engine to produce knowledge representations (e.g., numeric representations) from input data, e.g., application data. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of the inference engine. In some implementations, knowledge representations generated by machine-learning application 730 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In different implementations, machine-learning application 730 can produce different types of outputs. For example, machine-learning application 730 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 730 may produce an output video with a particular effect applied, e.g., rendered in a comic-book or particular artist's style, when the trained model is trained using training data from the comic book or particular artist, etc. In some implementations, machine-learning application 730 may produce an output based on a format specified by an invoking application, e.g. operating system 708 or one or more applications 712 and/or 714. In some implementations, an invoking application may be another machine-learning application. For example, such configurations may be used in generative adversarial networks, where an invoking machine-learning application is trained using output from machine-learning application 730 and vice-versa.

Any of software in memory 704 can alternatively be stored on any other suitable storage location or computer-readable medium. In addition, memory 704 (and/or other connected storage device(s)) can store one or more theme-based videos, a themes database, engagement metrics, a theme-based video application, an image database, and related data structures, parameters, audio data, user preferences, and/or other instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. Interfaced devices can be included as part of the device 700 or can be separate and communicate with the device 700. For example, network communication devices, storage devices (e.g., memory and/or database 106), and input/output devices can communicate via I/O interface 706. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 706 can include a display device 720 that can be used to display content, e.g., images, video, and/or a user interface of an output application as described herein. Display device 720 can be connected to device 700 via local connections (e.g., display bus) and/or via networked connections and can be any suitable display device. The display device 720 can include any suitable display device such as an LCD, LED, or plasma display screen, CRT, television, monitor, touchscreen, 3-D display screen, or other visual display device. For example, display device 720 can be a flat display screen provided on a mobile device, one or more display screens provided in a goggles device, or a monitor screen for a computer device.

The I/O interface 706 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software modules. In other implementations, server device 700 may not have all of the components shown and/or may have other elements including other types of elements instead of, or in addition to, those shown herein. While server system 102 is described as performing blocks and operations as described in some implementations herein, any suitable component or combination of components of server system 102 or similar system, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to generate a theme-based video, the computer-implemented method comprising:
 obtaining a theme, wherein a theme definition is associated with the theme, wherein the theme definition includes one or more stored image selection criteria, the image selection criteria specifying one or more image characteristics, the one or more image characteristics including at least one of: one or more visually-depicted image content features, one or more visually-depicted types of image content features, one or more geographic locations of image capture, or one or more times of image capture;
 retrieving the stored image selection criteria;
 querying an image database to obtain a plurality of images stored in the image database that meet the image selection criteria associated with the theme definition, wherein the plurality of images have one or more image characteristics that match the one or more image characteristics specified in the image selection criteria;
 obtaining a time difference threshold specified by the theme definition;
 determining that a time difference between a first timestamp associated with a first image of the plurality of images and a second timestamp associated with a second image of the plurality of images satisfies the time difference threshold; and
 in response to determining that the time difference satisfies the time difference threshold, generating the theme-based video that includes two or more images of the plurality of images, wherein the two or more images include the first image and the second image.

2. The computer-implemented method of claim 1, wherein the time difference satisfies the time difference threshold by being greater than or equal to the time difference threshold.

3. The computer-implemented method of claim 1, wherein the two or more images included in the theme-based video span a total threshold amount of time that is specified in the theme definition.

4. The computer-implemented method of claim 1 wherein the theme is obtained based on a user selection from a menu of displayed themes.

5. The computer-implemented method of claim 1, wherein each of the plurality of images is associated with a respective timestamp of a plurality of timestamps, and wherein the first timestamp is an earliest timestamp of the plurality of timestamps and the second timestamp is a most recent timestamp of the plurality of timestamps.

6. The computer-implemented method of claim 1, further comprising selecting the theme from a plurality of available themes, wherein selection of the theme is based on a number of images that were added to the image database within a time period relative to a current time.

7. The computer-implemented method of claim 1, further comprising selecting the theme from a plurality of available themes, wherein the theme is selected based on a current date of the generation of the theme-based video, wherein the current date matches a theme date that is specified in the theme definition.

8. The computer-implemented method of claim 1, wherein the one or more image characteristics specified by the stored image selection criteria include at least one of: each of the plurality of images has a different geographic location of capture, the plurality of images have locations of capture within a particular distance of each other, or the plurality of images have locations of capture within a particular distance of a particular location.

9. The computer-implemented method of claim 1, wherein the theme definition includes one or more parameters for generating the theme-based video, wherein the one or more parameters of the theme definition include at least one of: a minimum duration or maximum duration for the theme-based video, a frame rate for playback of the theme-based video, an indication of audio data to be played with the theme-based video, a transition effect displayed for images of the theme-based video, one or more visual filters to be applied to the theme-based video, or an indication of a title for the theme-based video.

10. The computer-implemented method of claim 1, further comprising:
 determining a threshold count based on the theme definition;
 determining whether a count of the plurality of images is less than the threshold count;
 in response to determining that the count of the plurality of images is less than the threshold count, further querying the image database to obtain one or more additional images that meet the image selection criteria; and
 repeating the determining and the querying until the count of the plurality of images is greater than the threshold count.

11. The computer-implemented method of claim 1, further comprising:
 calculating a confidence score based on the plurality of images and the theme definition, wherein the confidence score indicates a strength of match between the plurality of images and the image selection criteria; and
 selecting, from a database, a soundtrack for the theme-based video based at least in part on the confidence score,
 wherein generating the theme-based video includes generating the theme-based video to include the soundtrack.

12. A non-transitory computer-readable medium comprising one or more instructions stored thereon that, when executed by a processor, cause the processor to perform operations comprising:
 obtaining a theme, wherein a theme definition is associated with the theme, wherein the theme definition includes one or more stored image selection criteria, the image selection criteria specifying one or more image characteristics, the one or more image characteristics including at least one of: one or more visually-depicted image content features, one or more visually-depicted types of image content features, one or more geographic locations of image capture, or one or more times of image capture;
 retrieving the stored image selection criteria;
 querying an image database to obtain a plurality of images stored in the image database that meet the image selection criteria associated with the theme definition, wherein the plurality of images have one or more image characteristics that match the one or more image characteristics specified in the image selection criteria;
 obtaining a time difference threshold specified by the theme definition;
 determining that a time difference between a first timestamp associated with a first image of the plurality of images and a second timestamp associated with a second image of the plurality of images satisfies the time difference threshold; and in response to determining that the time difference satisfies the time difference threshold, generating a theme-based video that includes two or more images of the plurality of images, wherein the two or more images include the first image and the second image.

13. The non-transitory computer-readable medium of claim 12, wherein the time difference satisfies the time difference threshold by being greater than or equal to the time difference threshold.

14. The non-transitory computer-readable medium of claim 12, wherein the two or more images included in the theme-based video span a total threshold amount of time that is specified in the theme definition.

15. The non-transitory computer-readable medium of claim 12, wherein each of the plurality of images is associated with a respective timestamp of a plurality of timestamps, and wherein the first timestamp is an earliest timestamp of the plurality of timestamps and the second timestamp is a most recent timestamp of the plurality of timestamps.

16. The non-transitory computer-readable medium of claim 12, wherein the one or more image characteristics specified by the stored image selection criteria include at least one of: each of the plurality of images was captured in a different geographic location, the plurality of images were captured within a particular distance of each other, or the plurality of images were captured within a particular distance of a particular location.

17. The non-transitory computer-readable medium of claim 12, wherein the theme definition includes one or more parameters for generating the theme-based video, wherein the one or more parameters of the theme definition include at least one of: a minimum duration or maximum duration for the theme-based video, a frame rate for playback of the theme-based video, an indication of audio data to be played with the theme-based video, a transition effect displayed for images of the theme-based video, one or more visual filters to be applied to the theme-based video, or an indication of a title for the theme-based video.

18. A system comprising:
a memory; and
at least one processor configured to access the memory and configured to perform operations comprising:
obtaining a theme, wherein a theme definition is associated with the theme, wherein the theme definition includes one or more stored image selection criteria, the image selection criteria specifying one or more image characteristics, the one or more image characteristics including at least one of: one or more visually-depicted image content features, one or more visually-depicted types of image content features, one or more geographic locations of image capture, or one or more times of image capture;
retrieving the stored image selection criteria;
querying an image database to obtain a plurality of images stored in the image database that meet the image selection criteria associated with the theme definition, wherein the plurality of images have one or more image characteristics that match the one or more image characteristics specified in the image selection criteria;
obtaining a time difference threshold specified by the theme definition;
determining that a time difference between a first timestamp associated with a first image of the plurality of images and a second timestamp associated with a second image of the plurality of images satisfies the time difference threshold; and
in response to determining that the time difference satisfies the time difference threshold, generating a theme-based video that includes two or more images of the plurality of images, wherein the two or more images include the first image and the second image.

19. The system of claim 18, wherein the time difference satisfies the time difference threshold by being greater than or equal to the time difference threshold, and
wherein the two or more images included in the theme-based video span a total threshold amount of time that is specified in the theme definition.

20. The system of claim 18, wherein the theme definition includes one or more parameters for generating the theme-based video, wherein the one or more parameters of the theme definition include at least one of: a minimum duration or maximum duration for the theme-based video, a frame rate for playback of the theme-based video, an indication of audio data to be played with the theme-based video, a transition effect displayed for images of the theme-based video, one or more visual filters to be applied to the theme-based video, or an indication of a title for the theme-based video.

* * * * *